United States Patent [19]
Beldock et al.

[11] Patent Number: 5,592,462
[45] Date of Patent: Jan. 7, 1997

[54] THREE-DIMENSIONAL OPTICAL DATA STORAGE AND RETRIEVAL

[76] Inventors: Donald T. Beldock; James G. Beldock, both of 99 Biltmore Ave., Suite 260, Rye, N.Y. 10580

[21] Appl. No.: 367,059

[22] Filed: Dec. 30, 1994

[51] Int. Cl.⁶ .................................................. G11B 25/00
[52] U.S. Cl. ...................... 369/273; 369/275.3; 369/30
[58] Field of Search ........................ 369/273, 14, 275.1, 369/275.2, 275.3, 275.4, 30

[56] References Cited

U.S. PATENT DOCUMENTS

| | | | |
|---|---|---|---|
| Re. 32,075 | 1/1986 | Harrison et al. | 360/77 |
| 3,654,624 | 4/1972 | Becker et al. | 365/127 |
| 3,657,707 | 4/1972 | McFarland et al. | 365/127 |
| 4,101,976 | 7/1978 | Castro et al. | 365/119 |
| 4,288,861 | 9/1981 | Swainson et al. | 365/127 |
| 4,570,191 | 2/1986 | Di Stefano et al. | 360/77 |
| 4,677,605 | 6/1987 | Abed | 369/45 |
| 4,727,533 | 2/1988 | Erbert | 369/112 |
| 4,771,415 | 9/1988 | Taki | 369/112 |
| 4,820,913 | 4/1989 | Haddock | 235/487 |
| 4,912,312 | 3/1990 | Haddock | 235/487 |
| 4,995,025 | 2/1991 | Schluze | 369/32 |
| 5,202,875 | 4/1993 | Rosen et al. | 369/94 |
| 5,289,407 | 2/1994 | Strickler et al. | 365/106 |

*Primary Examiner*—David C. Nelms
*Assistant Examiner*—Andrew Q. Tran
*Attorney, Agent, or Firm*—David P. Gordon

[57] ABSTRACT

A three dimensional optical data storage and retrieval system includes a three dimensional optical data storage medium and an apparatus for providing access to data stored on the medium. According to one aspect of the invention, the data storage medium includes a number of concentric shells each of which has a curvilinear data storage surface for storing data in a number of substantially parallel data tracks. According to another aspect of the invention, the data storage medium includes a number of data storage surfaces which are rotatable about a common axis, each data storage surface for storing data in a number of substantially circular data tracks and having an optically transparent window which transects each of the data tracks. Each shell or data storage surface preferably has a drive engagement portion for engaging a driver to rotate the shells or data storage surfaces individually about a common axis. Several embodiments of spherical and cylindrical shell media are provided and a stacked discs embodiment is disclosed. Apparatus for accessing data on the medium includes a number of drivers for selectively rotating the shells and a laser-optical device. In some embodiments, a portion of the laser-optical device is incorporated in and made part of the outer shell of the medium. A jukebox apparatus is shown as well.

36 Claims, 18 Drawing Sheets

THREE-DIMENSIONAL OPTICAL DATA STORAGE AND RETRIEVAL

BACKGROUND OF THE INVENTION

1. Field of the Invention

The invention relates to laser-optical digital data storage and retrieval. More particularly, the invention relates to three dimensional laser-optical digital data storage and retrieval media and to methods and apparatus for storing and retrieving data using such media.

2. State of the Art

The first digital computers manipulated minute quantities of information by today's standards. Information was digitally stored on paper cards in quantities on the order of several bytes per card or on tape in quantities on the order of several kilobytes. Today, the ubiquitous desktop computer typically has access to several hundred megabytes of storage in a relatively small package, either a magnetic or optical disc. In some commercial applications it is not uncommon to provide several hundred gigabytes of online data stored on magnetic storage RAID (redundant array of inexpensive discs) or several hundred megabytes of online storage being selected from an optical storage "jukebox" containing several hundred gigabytes of storage. Nevertheless, in the present "information age", the amount of data which is desired, or often required, to be made available online is increasing faster than the technology for providing compact storage of this data.

In addition to the general commercial trend toward providing vast amounts of digitally stored data for business and scientific as well as for personal use, governments have become even more desirous of storing huge quantities of data which can be quickly and efficiently accessed by computers at remote locations. Of particular interest recently is the centralized storage of health care information. If the United States should adopt a centralized health care system, it would be desirable or even necessary to provide an electronically accessible central storage for all the medical information for every citizen. Given the nature of medical records and the present population of the United States, such a central storage could encompass approximately $2.4 \times 10^{18}$ bytes (2,400,000 terabytes) of data.

For example, the average number of x-ray films in the medical records of an American adult is thirty-eight 14×16 inch films. This assumes one major surgery (ten films), one minor surgery (four films), one accident (two films), and dental X-rays which may, over the course of a lifetime, amount to the equivalent of five 14×16 films. In addition, women are encouraged to have five mammograms prior to age forty and one mammogram every year from ages forty to sixty-five. The average number of films for an American male is thus twenty-three over the course of his life and the average number of films for an American female is thus fifty-three over the course of her life; the average number of x-ray films for all Americans therefore being thirty-eight. Ideally, X-ray films stored in digital form should be provided with relatively high resolution and broad gray scale or range of colors. An acceptable resolution for medical images could be 600 dpi (dots per inch) with a pixel depth of 24 bits. With this resolution and pixel depth, each 14×16 X-ray film would require $2.42 \times 10^8$ bytes (242 megabytes). In addition to X-ray films, the average medical records for an adult will likely contain an additional 4 megabytes of other information including text, sound, line art graphics, and DNA data. Therefore, a complete medical history in digital form for an average adult will likely require approximately 9200 megabytes (4 megabytes+[242 megabytes×38]).

Even using the best technology available, managing electronic access to that amount of data for 260 million people ($9.2 \cdot 10^9 \times 2.6 \cdot 10^8 \approx 2.4 \cdot 10^{18}$ bytes) would be cumbersome, incredibly expensive, and would require a very large amount of physical space. In fact, real-time or even timely access to the specific records would be generally impossible given today's storage and retrieval technology.

Laser disc technology presently provides one of the most space efficient, as well as cost efficient, digital storage media. Compact laser discs are manufactured from a sandwich of inexpensive plastic which is depicted schematically in prior art FIG. 1. An inner substrate 10 of optically reflective material approximately 0.5 µm thick is held between two layers of clear plastic 12, 14 each approximately 1.1 mm thick. The inner substrate is marked with microscopic pits 16 and flats 18 (each approximately 4 µm square and differing in depth by as little as 0.1 µm) which represent binary data. The pits and flats are arranged in concentric circular tracks 20. The disc is read by a photo detector and a laser beam having a diameter of approximately 0.1 µm which are aimed at the tracks and moved radially from track to track while the disc is spun at high speed.

Prior art FIG. 2 shows a schematic diagram of a laser disc reading apparatus. A drive motor 22 spins the disc 24 at approximately 200–500 rpm. An optical reader 26 which includes a laser 28, a prism 30, a lens system 32, and a photo detector 34 is aimed at the disc 24 and is moved mechanically from one track to the next. Since the data containing surface of the disc is planar, the optical reader need only move in a single linear path. It has been contemplated, however, to provide an optical reader which moves in a curvilinear path. For example, U.S. Pat. No. 4,995,025 to Schultze, the complete disclosure of which is incorporated herein by reference, discloses a "Spherical Pivoting Actuator for Read/Record Head". Various methods are used to acquire and maintain focus of the optical reader relative to the disc such as that disclosed in U.S. Pat. No. 4,677,605 to Abed for "Focus acquisition and Maintenance for Optical Disk System", the complete disclosure of which is incorporated herein by reference.

Referring, once again, to prior art FIG. 2, the drive motor 22 changes speed as different tracks are read to maintain a constant linear speed of the data containing tracks relative to the optical reader 26. Light from the laser 28 is reflected from the flats on the accessed disc track and is received through the lens system 32 and directed by the prism 30 to the photo detector 34. Some systems have proposed elimination of the prism such as the system disclosed in U.S. Pat. No. 4,771,415 to Taki for an "Optical Data Storage and Readout Apparatus and Head, Using Optical Fibers Between Stationary and Movable Units", the complete disclosure of which is incorporated herein by reference. In any case, as the laser light is more or less reflected from the flats and pits, the detector 34 senses a sequence of relative lightness and darkness representing digital 1's (flats) and 0's (pits). These 1's and 0's represent the digital data stored on the disc.

Most compact laser discs are Read Only media (CDROMs) and are manufactured by pressing the substrate with a die much the same way as vinyl phonograph records are produced. However, recent technology has made it possible to provide laser discs which can be written on and erased as well as read. This technology involves the physical nature of the substrate which can be deformed and reformed in response to different types of laser radiation. Rewritable optical discs are called phase-change optical discs, and they are coated with a thin, crystalline film. When a laser beam having a first intensity strikes the film, it forms glasslike, or amorphous, spots that change the film's reflectivity thereby simulating the pits and flats of a CDROM and thus "recording" data on the disc. A lower level laser beam is used to read the discs in a substantially conventional manner. A laser beam having a second intensity can restore the crystalline structure of the film to its original state thereby "erasing" the spots which were recorded with the first intensity laser beam.

Compact laser discs range in diameter from two inches to sixteen inches. A popular "five inch" disc, which has a capacity of approximately 680 megabytes, is actually approximately 4.73 inches in diameter and is approximately 0.05 inches high (thick). It has a central mounting hole surrounded by a clear unusable area having a diameter of approximately 1.6 inches. The usable area upon which data may be stored on the disc is approximately 15.3 square inches. The five inch compact disc therefore represents an areal storage density of approximately 44.4 megabytes per square inch. Each compact disc occupies a volume of approximately 0.88 cubic inches using the formula $V=\pi r^2 h$. A protective caddy or jewel box case for the disc is typically approximately 5.6 inches by 4.9 inches by 0.4 inches deep and therefore has a volume of approximately 11 cubic inches. In its protective caddy, the "five inch" disc represents a volumetric storage density of approximately 62 Mb/cu.in. While this is an impressive number, it could be much higher if the protective caddy and the two layers of clear plastic could be removed. Unfortunately, such removal would render the disc so fragile as to make it unreliable. Even with the two layers of clear plastic, the disc is not invulnerable to fatal scratches. When a disc is being constantly handled, such as in a CD jukebox, it should be protected from dirt and scratches by a disc caddy.

Given a storage capacity of 680 megabytes per disc, it would require 13.5 compact discs (9200 megabytes divided by 680 megabytes) to store the medical records for a single person. For a population of 260 million, approximately $3.5 \times 10^9$ compact discs would be required to store complete medical information for everyone. Given that the protected volume of a compact disc in a jewel box or caddy is approximately 11 cubic inches, a space of $3.86 \times 10^{10}$ in$^3$ or $2.23 \times 10^7$ ft$^3$ would be required to house enough five inch compact discs to store the medical records of every person in the United States. This space can be exemplified by a forty-seven story building the size of a football field (300 feet by 160 feet). Such a building would only provide the space necessary to house the discs packed as closely together as possible. Clearly, a much larger building would be required to provide convenient access to the discs. In addition, no matter how large the building, convenient access to three and a half billion compact discs seems unlikely no matter what method were used.

It is possible to store almost 39 gigabytes of data on a single sixteen inch optical disc, almost sixty times the storage capacity of a compact five inch disc. However, a sixteen inch optical disc housed in a protective case which is 16.2 inches square and 0.4 inches thick occupies a volume almost ten times that of a compact disc. Therefore, while some considerable saving in space can be achieved through the use of sixteen inch discs, the number of discs required will still be very high (on the order of tens of millions) and the storage space required will still be on the order of hundreds of thousands of cubic feet.

Recently introduced CDROM jukebox systems attempt to provide large amounts of online storage, but the best of these systems provides only about 65 gigabytes. For example, the CASCADE CD-100 from PINNACLE MICRO of California includes a TOSHIBA double-speed CDROM drive and an apparatus for shuffling one hundred conventional CDROM discs in which a disc is retrieved in approximately six seconds from when it is requested. Another jukebox system called PRAXIS from MAXOPTIX (Boston, Mass.) utilizes two 1.3 gigabyte erasable optical disc drives and forty-six optical cartridges held in an auto-changer for a total Online capacity of about 60 gigabytes. The auto-changer is alleged to load an optical cartridge in about 2.5 seconds.

Apart from jukeboxes, recent developments in optical storage technology have been aimed at increasing storage capacity of individual discs through a number of different techniques. In May 1994, SONY disclosed a new storage technique which substantially increases the capacity of an optical disc. See, SCIENTIFIC AMERICAN, August 1994, Volume 271, Number 2, Page 87. In conventional optical discs, information is stored by varying the length of each pit and the distances between the pits (i.e. the length of the flats and the pits). The SONY system arranges the centers of the pits at regular intervals with respect to one another while varying the distance from the front and rear edge of each pit to its center. This scheme doubles the number of bits that each pit holds.

TOSHIBA recently developed a 3.5-inch, double-sided disc which holds 606 megabytes. Late last year MATSUSHITA introduced a 5.25-inch phase-change disc having a capacity of 1.5 gigabytes. In May 1994 the company announced a method, similar to SONY'S edge-modulation technique, that could quadruple the capacity of a phase-change disc to 6 gigabytes. Id.

Efforts to increase the storage density of optical discs have also involved the type of laser used to record and read the pits and flats on an optical disc. Conventional optical storage systems use a red laser which can inscribe or read a pit which is approximately 4 µm square. Experiments with blue-violet lasers demonstrate the ability to inscribe and read pits which are two and a half to three times smaller than the conventional pits. See, SCIENTIFIC AMERICAN, July 1994, Volume 271, Number 1, Page 100. However, these lasers, which require sophisticated cooling and are very expensive, are not yet commercially available and may not be for several years.

As the prior art demonstrates, the efforts made toward increasing the capacity of optical discs have been mainly aimed at optimizing the way data is stored on the discs (the size and dimensions of the pits as well as various data compression schemes) rather than at changing the overall geometry of the medium itself. Nevertheless, since the discovery of the hologram, thought has been given to methods of storing digital data in three dimensions. The IBM Almaden Research Center presently maintains a project to study the feasibility of holographic storage. See, SCIENTIFIC AMERICAN, October 1994, Volume 271, Number 4, Page 128. A technique developed by IBM multiplies the capacity of discs by stacking them on top of one another and gluing them together. Unlike conventional compact discs, which have opaque metal film substrates, the IBM optical discs are virtually transparent, allowing the laser to penetrate them and scan the surface of discs below. At the same time, the surfaces are reflective enough so that when the laser focuses on them, it can read the pits and flats. A movable lens adjusts the focal point of the laser, allowing it to read the surface of any disc in the stack. So far the IBM researchers have managed to place as many as six discs in a single stack and report that there are no technical obstacles to creating sandwiches of 10 discs, which would be only slightly thicker than a standard compact disc. This multiple surface optical storage system is described, at least in part, in U.S. Pat. No. 5,202,875 to Rosen et al. which is hereby incorporated herein by reference in its entirety. Some of the IBM-developed technology has been adopted by TAMARACK STORAGE DEVICES of Austin, Tex. Their holographic storage device, which is shown in prior art FIG. 3, uses a rotating disc 36 which is coated with a photopolymer. Holographic images as shown at 38 of pits and flats are created on the photopolymer 36 and read with two interfering laser beams 40, 42 which are derived from a single laser 44 with the use of a beam splitter 46, a mirror 47, a mirroring LCD 48, and a lens 49. The TAMARACK system uses 2.5 inch discs each of which is said to have the same capacity as a 5 inch CDROM. However, since the data is stored in a conventional photochemical manner on the photopolymer, it cannot be erased and rewritten.

SUMMARY OF THE INVENTION

It is therefore an object of the invention to provide an optical storage medium having an increased storage density per unit of volume.

It is another object of the invention to provide an optical storage medium which is durable and resistant to fatal scratching.

It is still another object of the invention to provide an apparatus for reading from and writing to a three dimensional optical storage medium.

It is also an object of the invention to provide an apparatus and a method for reading from and writing to nested three dimensional optical storage media.

It is also an object of the invention to provide an optical storage medium which is both readable and writable as well as erasable.

It is still another object of the invention to provide a method for manufacturing a three dimensional optical storage medium.

In accord with these objects which will be discussed in detail below, the three dimensional optical storage system of the present invention includes a three dimensional optical storage medium and an apparatus for reading from and writing to the medium. The medium includes a number of layers which are rotated about a common axis. In one embodiment, the layers are concentric spherical shells, although ellipsoidal shells are also possible. Another embodiment uses cylindrical shells. Yet another embodiment uses a stack of layered discs. In the presently preferred embodiment, the shells or layers are selectively rotatable about a common axis, and each shell, except for the outer-most one, is provided with an optically transparent window. Data is stored on each shell in parallel rings, referred to herein as "tracks" of pits and flats following circular paths which lie in planes substantially perpendicular to the axis of rotation of the shells. Each track is discontinued at the optical window of the shell. The optical window is typically a meridian which preferably lies in a plane which includes the axis of rotation of the shell. A laser-optical device located inside the inner most shell reads (and writes) data on the inner surface of the shells. In order to access a shell which is other than the inner-most shell, the optical windows of all of the shells which are "inner" relative to the shell of interest are aligned, and those inner shells are held stationary while the outer shell of interest, i.e., the shell being accessed, is rotated. In other words, the laser-optical device accesses the inner surface of an outer shell through the optical windows of the shells inner relative to that shell.

In the spherical shell embodiment, each track is arranged so that it lies in a plane perpendicular to the axis of rotation and the optical window is preferably arranged so that it lies in a plane parallel to the axis of rotation. A support structure is provided at one or both poles of the shells in order to keep the shells spaced apart from each other and allow them to be selectively rotated. The shells may be rotated by one or more variable speed motors, although a magnetic field rotation apparatus is also disclosed.

According to a first version of the spherical shell embodiment, each shell is provided with an opening at a polar cap and a combination laser-optical device and driver apparatus enters the shells through the polar cap openings. The polar cap opening of each shell is preferably different with the inner-most shell having a polar cap opening of relatively smaller diameter and the outer-most shell having a polar cap opening of relatively larger diameter. The edge of each polar cap opening is provided with a driver engagement means which may be a gear tooth edge or a cylinder extending from the polar cap opening for engaging an external driver apparatus. In this version of the spherical shell embodiment, the shells are read from and written to from the interior of the inner-most shell and apart from the optically transparent window, the shells are preferably opaque. The driver portion of the combination laser-optical device and driver apparatus engages each shell at its polar cap and a coaxial laser-optical device portion enters the inner-most shell. The laser-optical device portion is movable and focusable to address each track of each shell.

In another version of the spherical shell embodiment, a portion of the laser-optical device is located at the center of the inner-most shell and another portion of the laser-optical device is located on the inner surface of the outer-most shell. In this version of the spherical shell embodiment, all of the shells, with the possible exception of the outer-most shell which does not hold any data, are partially transparent. One portion of the laser-optical device is a source of laser radiation and the other portion of the laser-optical device is a detector of laser radiation. Each shell is accessed by aligning the optical windows of all the shells except for the one being accessed, rotating the accessed shell while holding the others stationary, and transmitting laser radiation from the source through the accessed shell to the detector. According to this version, the location of the source and detector of laser radiation may be reversed for either a "shine out" or "shine in" system.

In the cylindrical shell embodiment, each track is circular, having its center on the axis of rotation of the cylindrical shell, and spaced along the length of a cylindrical shell. A support structure, e.g., in the form of rod bearings, is provided between each shell in order to keep the shells spaced apart from each other and allow them to be selectively rotated. Each shell is provided with an optically transparent window which transects each track on the shell. The cylindrical shells are accessed using a method and apparatus similar to that described above with regard to the spherical shells. The cylindrical shell embodiment offers some advantages regarding mechanical simplicity, but the spherical shell embodiment offers the highest data density per unit volume.

Utilizing the window technique of the invention, and in accord with another embodiment of the invention, an optical medium of stacked discs is provided where each disc (except for the one most distant from the laser/optical device) has an optically transparent window and is independently rotatable. The laser/optical device is focusable onto any one of the discs in the stack and a disc is accessed by aligning all of the windows of the discs between the laser/optical device and the accessed disc and rotating only the accessed disc.

Jukebox mechanisms are provided for the media according to the invention. Regardless of which embodiment is used (cylindrical or spherical), the outer-most shell is preferably constructed of a durable material and since data is stored on the inside surfaces of the shells, the medium may be handled by a jukebox (even rolled along tracks) without risk of fatal scratching. Each concentric shell system is preferably hermetically sealed so that the maximum number of shells may be used. In order to achieve hermetic sealing while still allowing jukebox functionality, each shell system may include a portion of the driver/laser-optical system sealed within it and be provided with a mechanical and fiber optic coupling for removable attachment to a jukebox device. Alternatively, each shell system may be provided with a removable cap which is removed by the jukebox system prior to "mounting" the shell system in an hermetically sealed environment.

Utilizing techniques recently known in the art, it may be possible to eliminate the need for an optical window in each shell and the thereby also eliminate the need for independent rotation of the shells. In such an embodiment, all of the shells are partially transparent and partially reflective. The shells are rotated about a common axis simultaneously and different shells are accessed using a focusing technique taught by IBM as described above.

It is expected that several hundred shells can be incorporated in a single hermetically sealed shell system and that such a spherical shell system having an outer diameter of three to seven inches will have a storage capacity greater than hundreds or thousands of five inch CDROMs.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
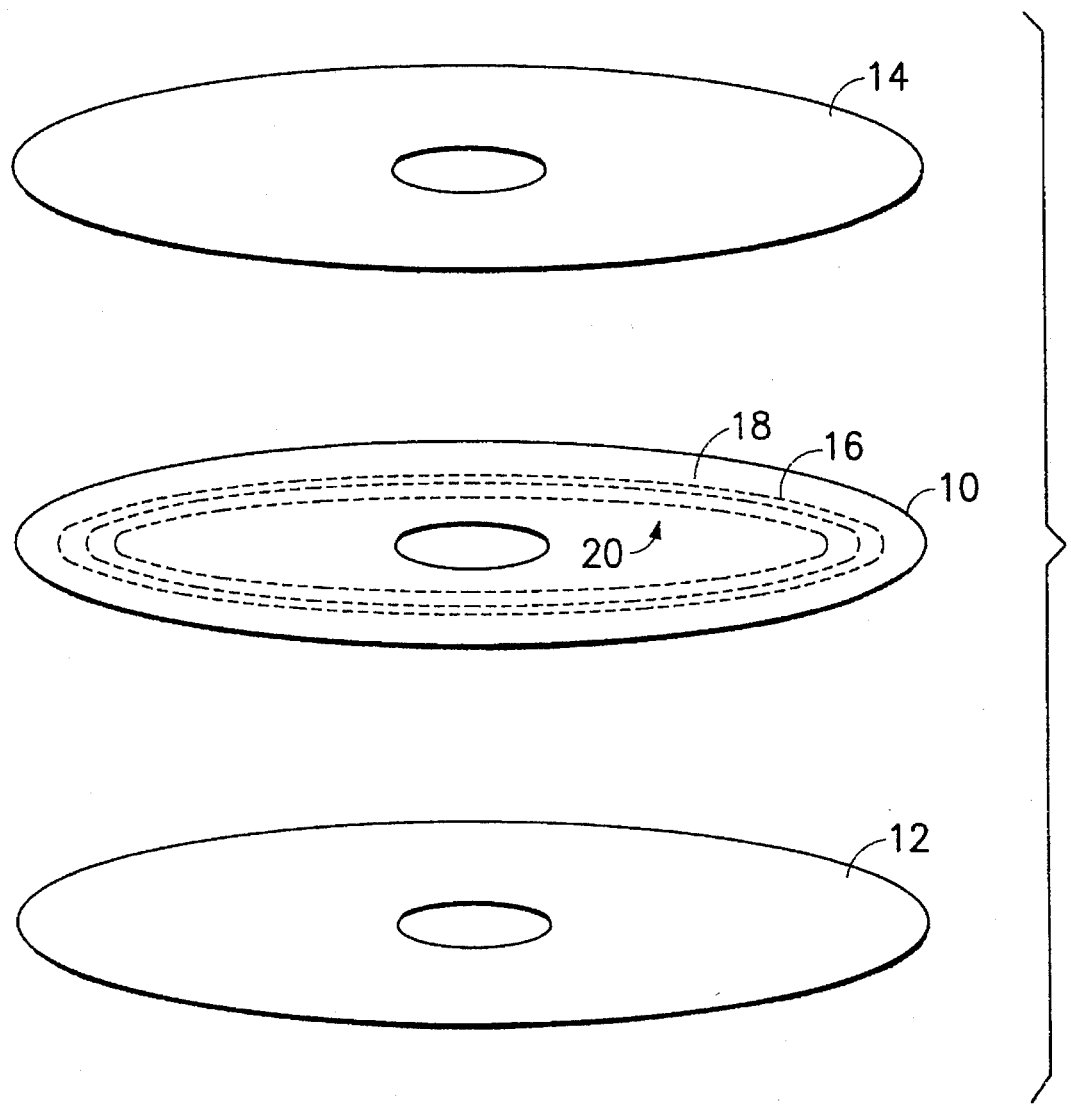
FIG. 1 is schematic diagram of the pits and flats in a prior art optical disc.
Figure 2:
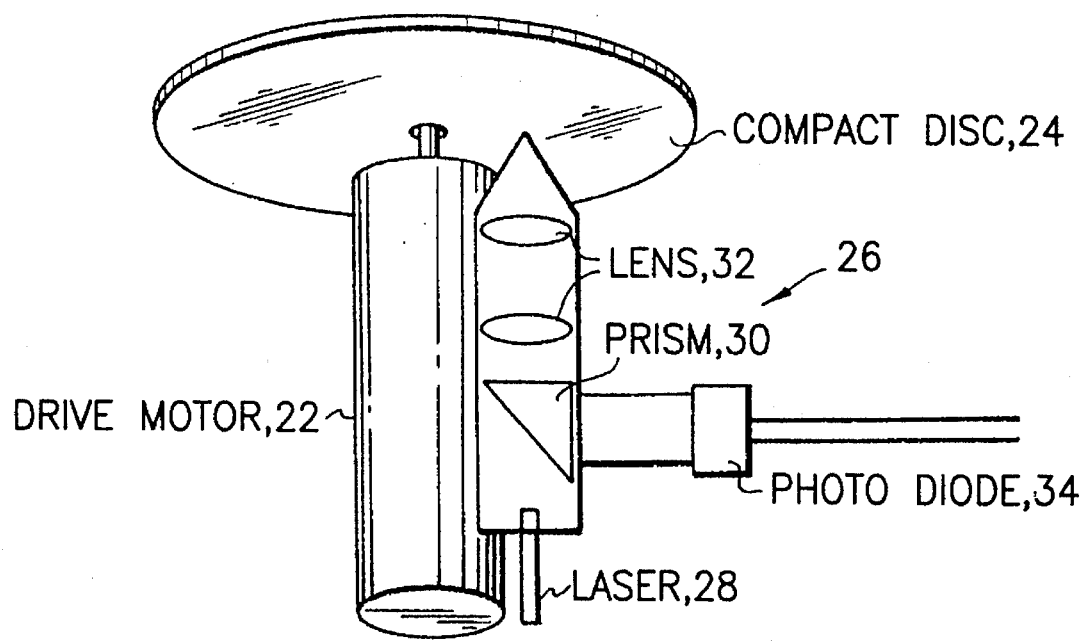
FIG. 2 is a schematic diagram of a prior art optical disc reader.
Figure 3:
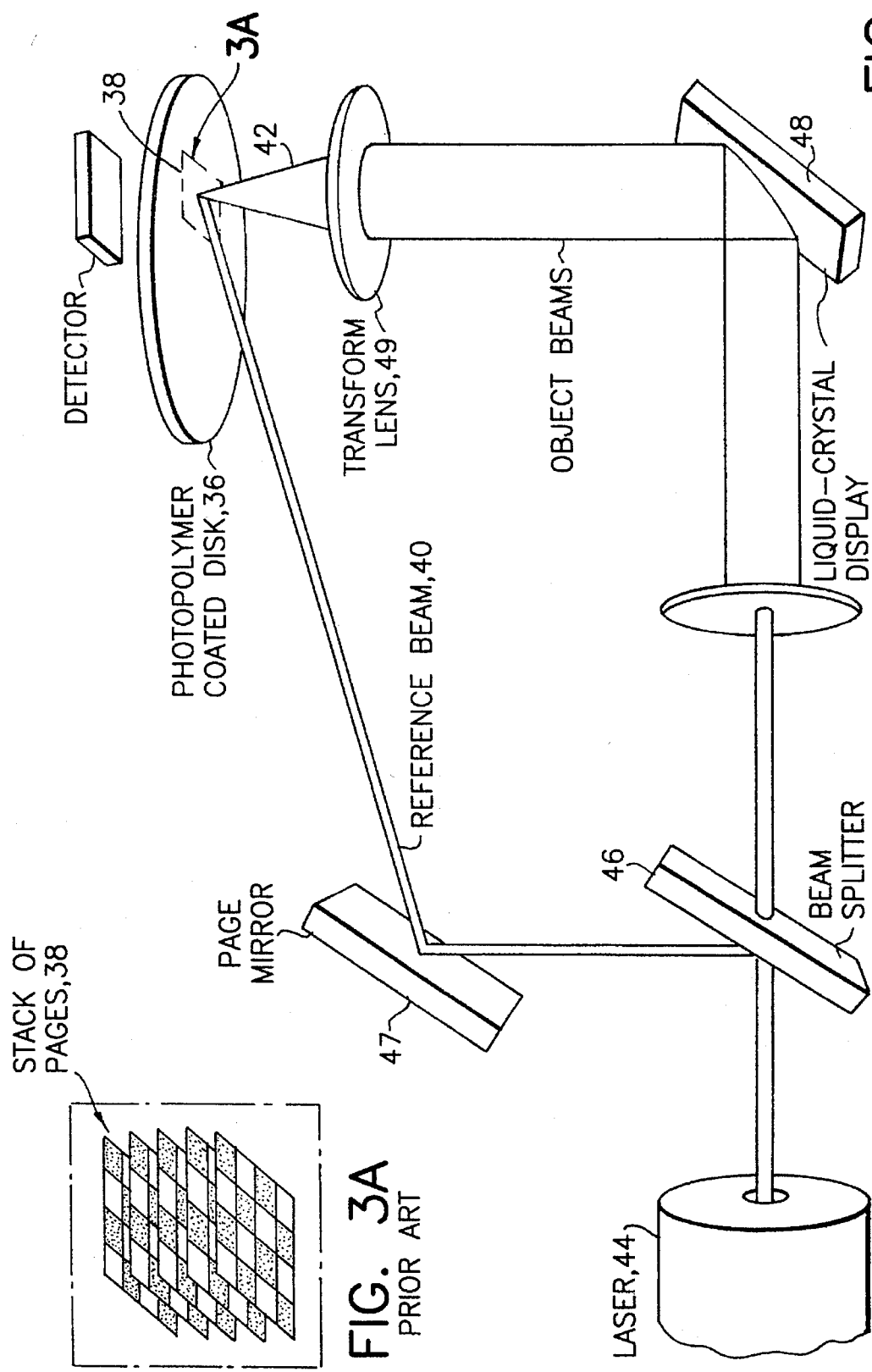
FIG. 3 is a schematic diagram of a known holographic optical disc system.
Figure 4:
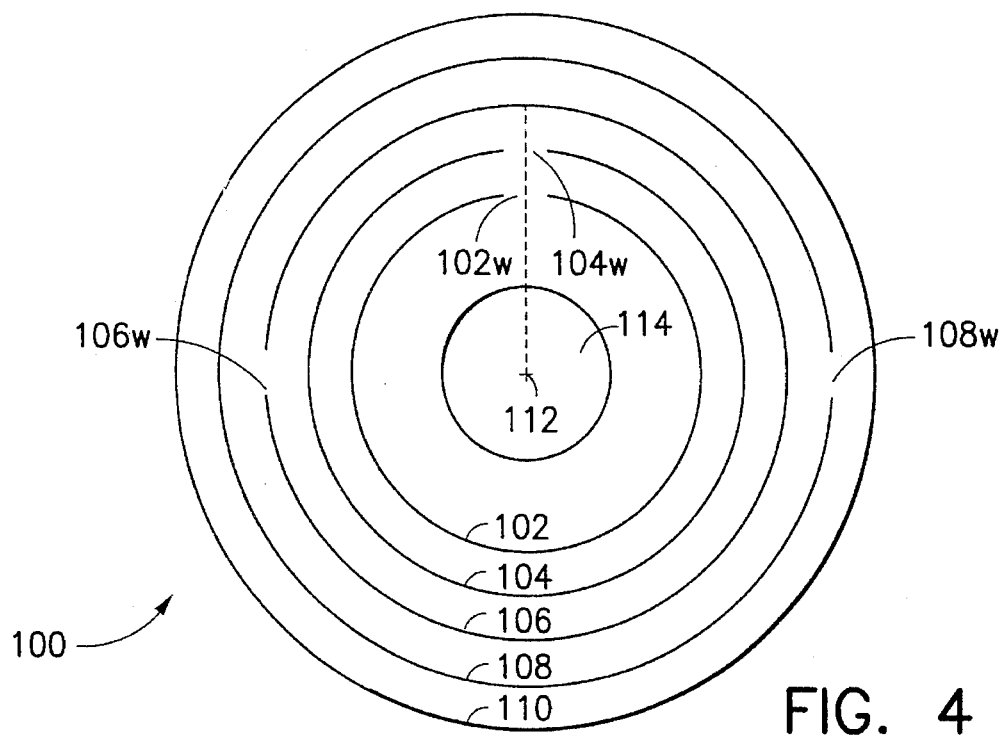
FIG. 4 is a schematic diagram of a concentric shell storage system according to the invention.

Referring now to FIG. 4, the basic concept of the invention is illustrated schematically. According to the invention, a laser-optical data storage medium 100 includes a plurality of rotatable concentric shells 102, 104, 106, 108, 110 which may be either spherical or cylindrical. For simplicity, the medium shown in FIG. 4 is illustrated as having five concentric shells although as will be described in detail below, hundreds of shells are possible. FIG. 4 may be considered a cross sectional view perpendicular to the concentric axis of rotation 112 of either spherical or cylindrical shells. Each shell, with the exception of the outer most shell 110 is provided with an optical window 102w, 104w, 106w, 108w which may be an opening in the shell or a portion of the shell which is rendered transparent to a laser. The outer most-shell 110 is preferably constructed of a durable material to facilitate handling of the medium 100. Each of the shells is independently rotatable about a common axis 112 and a laser-optical device 114 is located inside the inner-most shell 102. Data is stored on the interior surface of each shell and is accessed by the laser-optical device 114. In order to access data on an outer shell, e.g. shell 106, the inner shells, e.g. 102 and 104, are rotated so as to align their windows 102w, 104w providing an optical path from the laser-optical device 114 to the accessed shell 106. The inner shells 102 and 104 are held stationary while the shell 106 being accessed is rotated relative to the laser-optical device 114. The driving device which selectively rotates the shells is omitted from FIG. 4 as it will differ depending on which embodiment of the invention is used. Several different driving devices are described in detail below. Moreover, as the accessed shell is being rotated, the laser-optical device is aimed at different tracks on the accessed shell as will be described in detail below.

Figure 5:
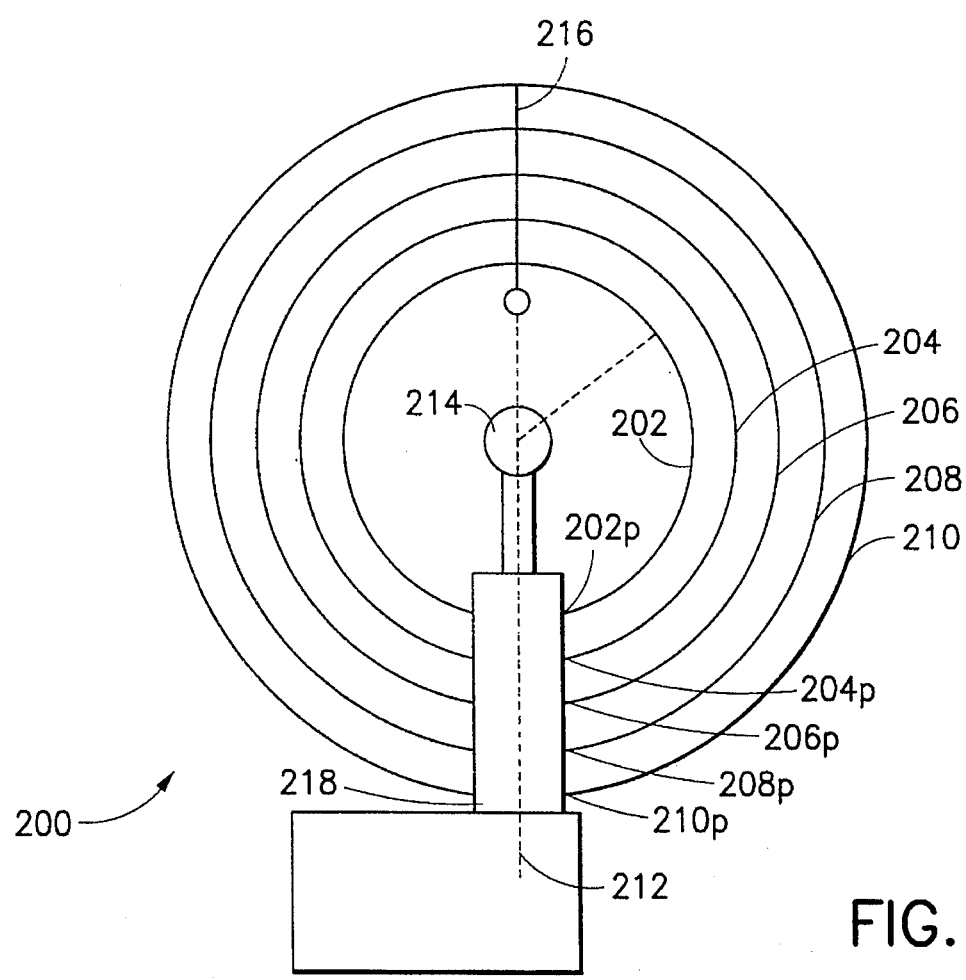
FIG. 5 is a schematic diagram of a first version of a spherical shell system according to the invention.

FIG. 5 shows a simplified schematic view of a spherical shell embodiment of a storage medium 200 of the invention in cross section along the axis of rotation 212. The medium includes a plurality of concentric spherical shells 202, 204, 206, 206, 208, 210. The shells are supported by a polar axle 216 which maintains the shells spaced apart from each other and allows them to be individually rotated. Each shell is provided with a polar opening 202p, 204p, 206p, 208p, 210p. The polar openings serve two functions: to allow a laser-optical device 214 to enter the center of the inner most shell 202; and to allow a shell driver 218 to engage and selectively rotate each shell.

Figure 6:
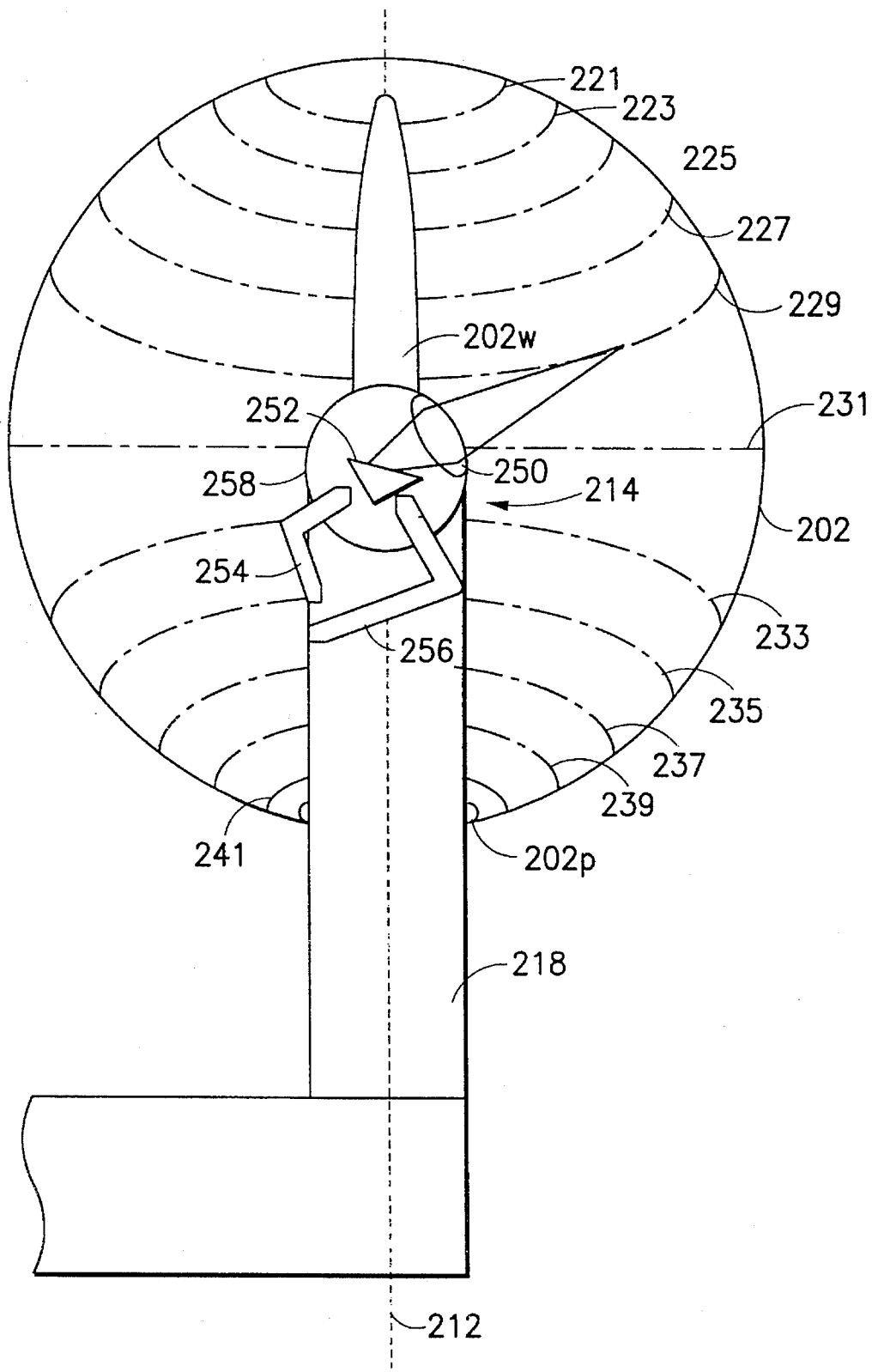
FIG. 6 is a schematic projection of the interior of the inner most shell of the spherical shell system of FIG. 5 and a laser-optical device.

FIG. 6 shows a schematic detail of the inner-most shell 202 with the laser-optical device 214 and shell driver 218. The shell 202 is representative of each of the concentric shells shown in FIG. 5. As seen in FIG. 6, the shell 202 has a plurality of data tracks 221, 223, 225, 227, 229, 231, 233, 235, 237, 239, 241 which are representative of typically hundreds of thousands of tracks and are arranged latitudinally relative to the axis of rotation 212. Each of the data tracks contains a plurality of pits and flats which are read as digital data by the laser-optical device 214. The laser-optical device 214 includes a lens 250, a prism 252, and a pair of optical wave guides 254, 256 which are preferably flexible fiber-optic cables. The lens 250 and the prism 252 are mounted in a tiltable head 258 which is described in further detail below with reference to FIGS. 6a and 6b. One end of the fiber-optic 254 is coupled to a source of laser radiation (not shown) and the other end is arranged relative to the prism 252 such that laser radiation emitted from the end of the fiber-optic 254 is directed through the prism 252 and the lens 250 to be focused on a data track, e.g. track 229 as shown in FIG. 6. One end of the fiber-optic 256 is coupled to an optical detector (not shown) and the other end is arranged relative to the prism 252 such that laser radiation reflected back from flats in the data track passes through the lens 250 and the prism 252 into the end of the fiber-optic 256. It will be appreciated that when the laser-optical device is aimed at a specific track, e.g. 229 and the shell 202 is rotated about axis 212 by the shell driver 218, data is read from the data track in a manner similar to that used presently in CDROM drives. Moreover, it will be appreciated that using conventional technology, data may be written to and erased from the data track 229. Also, while not necessary, it is preferable that means be provided to automatically return the windows of each shell to an aligned position when the shells are not being rotated.

Figure 6B:
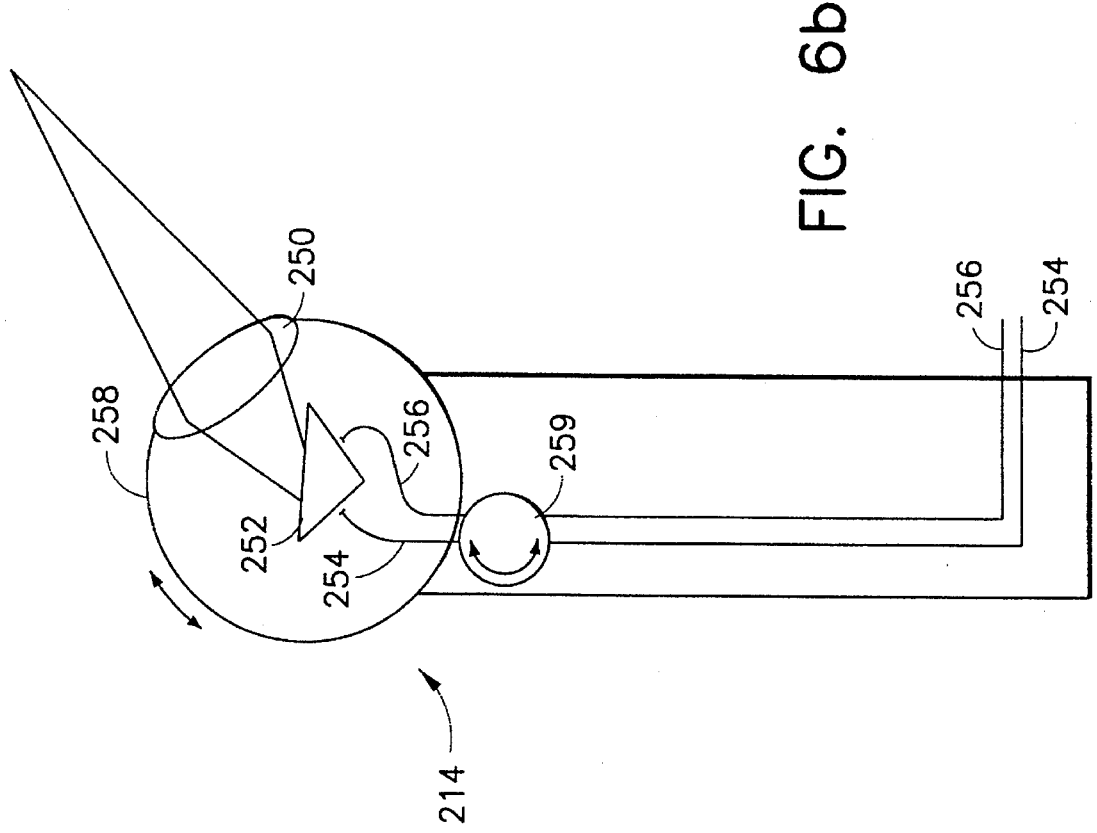
FIGS. 6a and 6b are schematic diagrams of a first embodiment of the laser-optical device of FIG. 6 aimed at different angles.
Figure 6A:
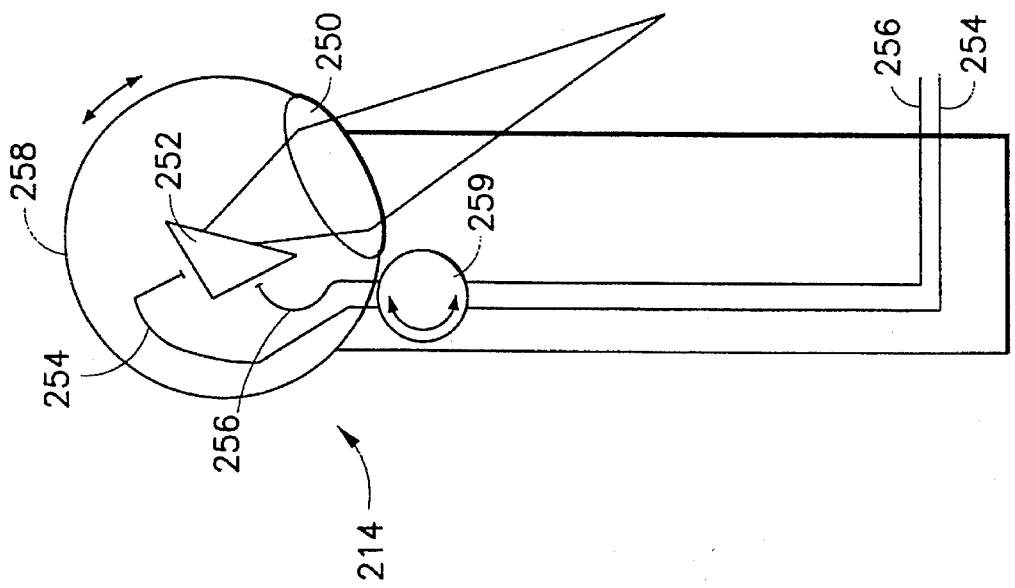
Figure 6D:
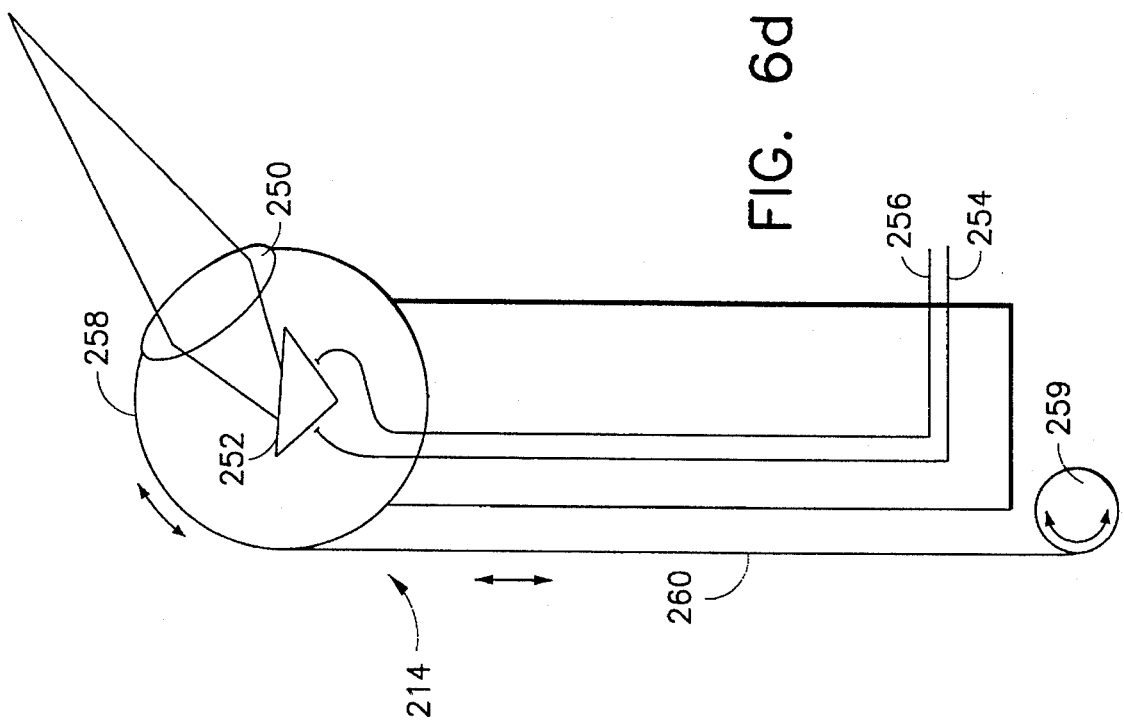
FIGS. 6c and 6d are schematic diagrams of a second embodiment of the laser-optical device of FIG. 6 aimed at different angles.
Figure 6C:
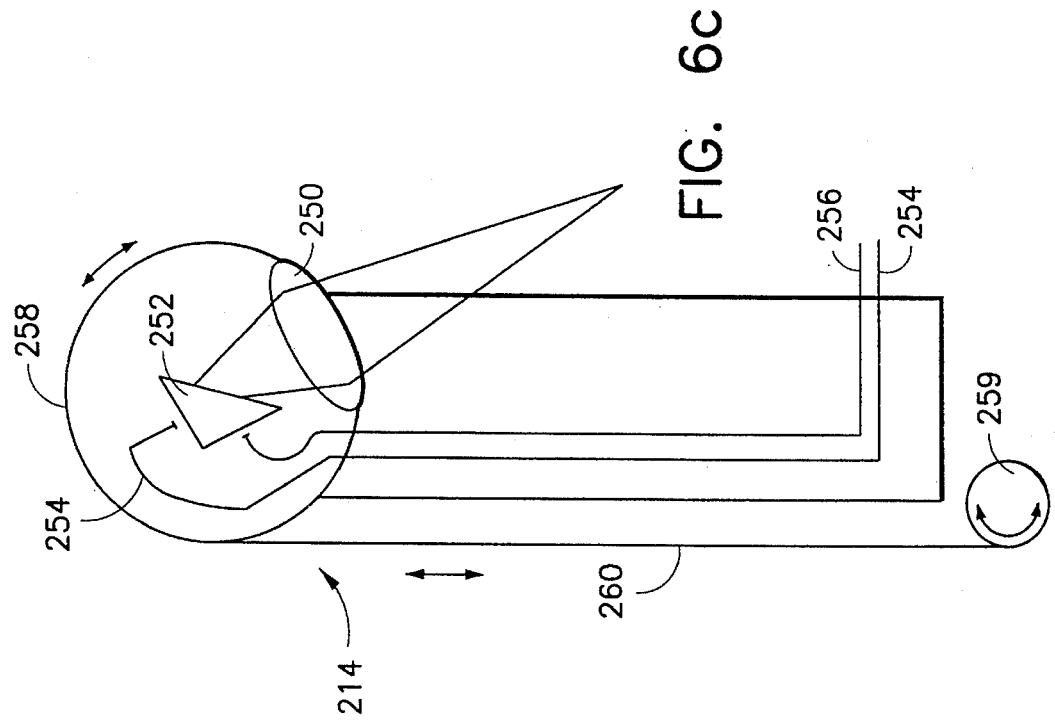

A first embodiment of the laser-optical device 214 is directable to focus on different tracks as shown for example in FIGS. 6a and 6b. In this embodiment, the tiltable head 258 is directly engaged by a stepper motor 259 which is mounted adjacent the head 258 and which tilts the head 258 in step-wise increments. Although not shown in FIGS. 6a and 6b, it will be appreciated that the head 258 is mounted for rotation and that the stepper motor 259 engages the head 258 in a positive manner such as by a gear engagement. Alternatively, as shown in FIGS. 6c and 6d, the stepper motor 259 may be mounted apart from the head 258 (e.g. outside the shells 202–210 shown in FIG. 6). The stepper motor 259 is then coupled to the head 258 by one or more pulley rods 260. It will be appreciated that the pulley rod(s) 260 may be embodied as a toothed rack, for example. In this case, the engagement of the head 258 with the rod(s) 260 and the engagement of the stepper motor 259 with the rod(s) 260 will be that of a pinion engaging the rack. Such a rack and pinion coupling of the stepper motor 259 with the tiltable head 258 provides an accurate positioning of the head 258 so that it is aimed at a selected track on a shell accessed for reading or writing.

Figure 6E:
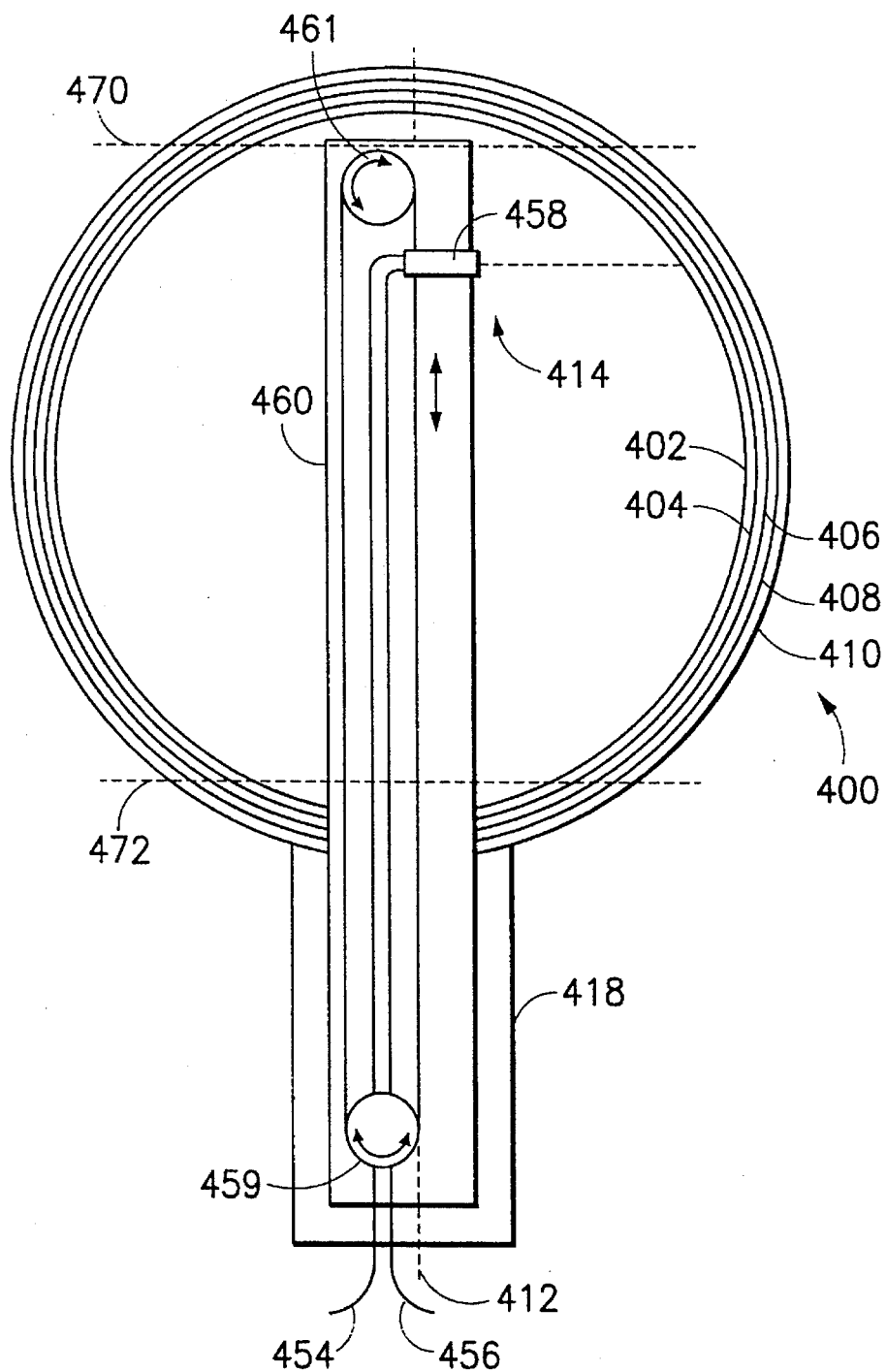
FIG. 6e is a schematic diagram of a third embodiment of the laser-optical device.

FIG. 6e shows an alternative embodiment of a laser-optical device 414 for use with a storage medium 400 which is substantially the same as the storage medium 200 described above. The storage medium 400 has concentric shells 402, 404, 406, 408, 410 which are closely spaced and the inner-most shell 402 has a relatively large diameter. Given the relatively large diameter of the inner shell 402, it is possible to use a laser-optical device 414 which is translatable along an axis rather than tiltable about a point. The laser optical device 414 according to this embodiment is substantially the same as the laser-optical device 214 described above except that its head 458 is not tiltable. Instead, the head 458 is mounted on an endless cable 460 which is engaged by a stepper motor 459 and a return pulley 461. When the storage medium 400 is mounted on the shell driver 418, the pulley 461 is disposed close to the pole of the inner shell 402. The stepper motor 459 causes the cable 460 to move translationally relative to the pulley 416 thereby causing the head 458 of the laser-optical device 414 to be moved translationally along a path parallel to the axis of rotation 412. It will be appreciated that in this embodiment, all of the parallel tracks on the shells can be accessed, except for tracks at the extreme poles of the shells. For example, as seen in FIG. 6e, tracks above the dotted line 470 or below the dotted line 472 would not be accessible using this arrangement of the laser-optical device 414. However, as mentioned above, if the inner shell 402 has a large enough diameter and the outer shells 404–410 are closely spaced relative to each other and the inner shell 402, the number of polar tracks which are inaccessible, and the amount of data thereon can be considered negligible.

Figure 7:
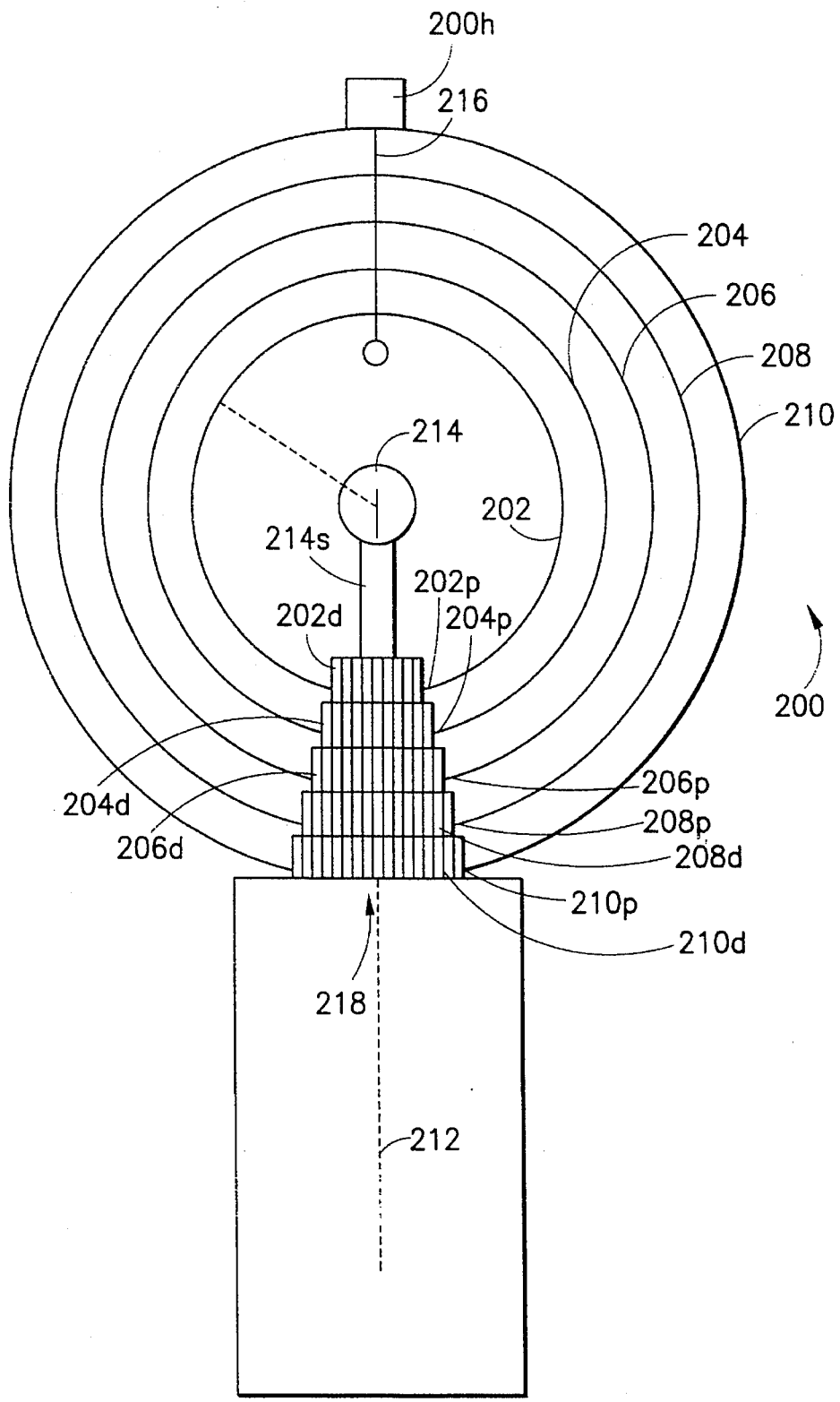
FIG. 7 is a view similar to FIG. 5 of a first embodiment of a shell driver for use with the spherical shell system of FIG. 5.
Figure 7A:
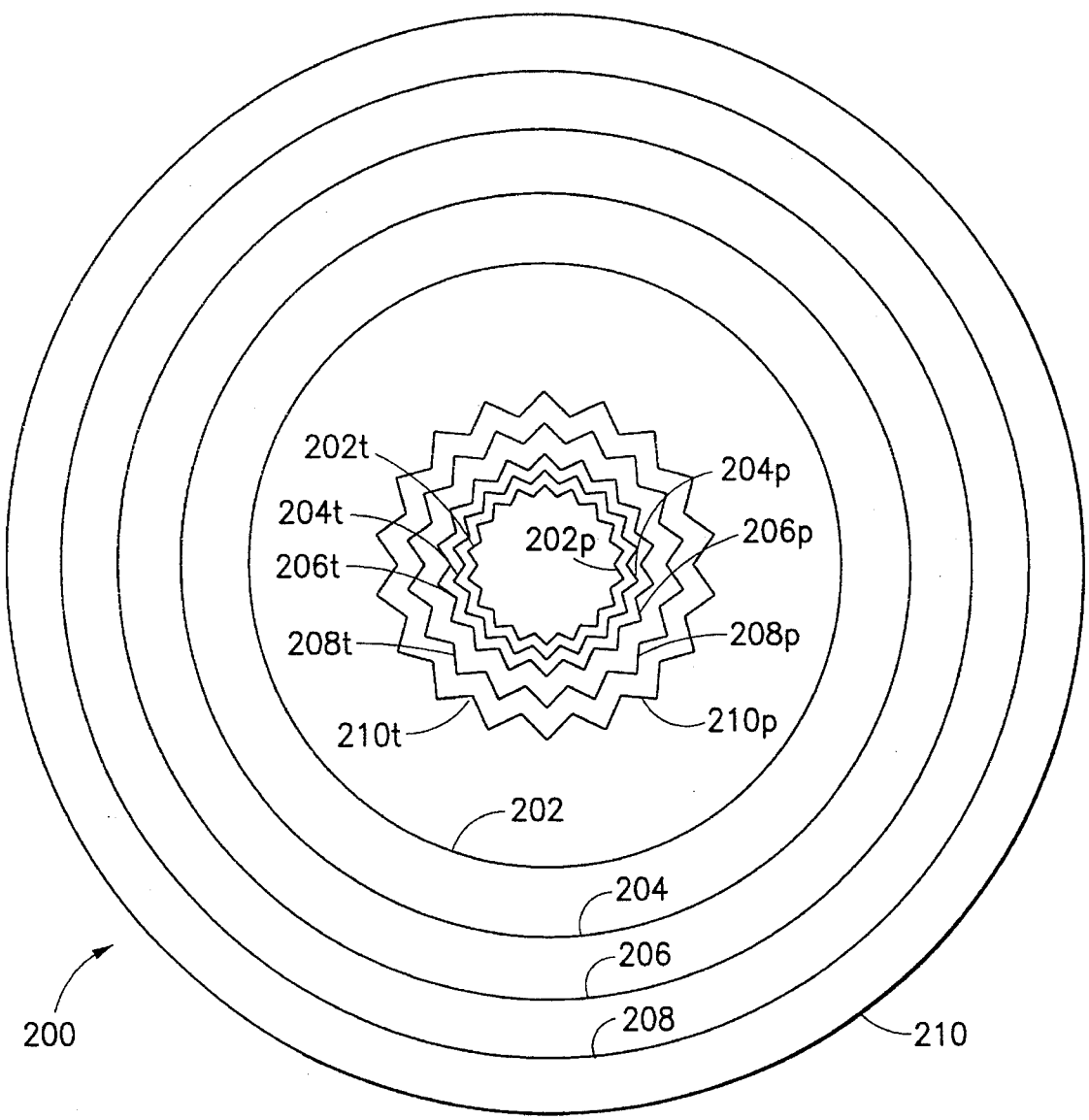
FIG. 7a is a plan view of the polar openings of the shells from FIG. 7 showing the toothed edges which engage the shell driver of FIG. 7.

As mentioned above, the shells 202, 204, 206, 208, 210 (402–410) are individually rotatable about a common axis 212 (412) by the shell driver 218 (418). FIG. 7 shows a first embodiment of the shell driver 218 and FIG. 7a shows details of the polar openings 202p, 204p, 206p, 208p, 210p of the shell system 200 which are engaged by the shell driver. Turning now to FIGS. 7 and 7a, the shell driver 218 includes a plurality of gears 202d, 204d, 206d, 208d, 210d corresponding in number to the number of shells in the shell system 200. The gears are spaced apart along the axis of rotation 212 and vary in size as illustrated in FIG. 7, for example. Each gear is coupled to a cylindrical drive shaft (not shown) which in turn is coupled to a drive motor (not shown). There may be a single drive motor which is selectively coupled to the drive shaft corresponding to the shell being accessed, or there may be a separate drive motor for each drive shaft. In either case, the motor(s) is preferably a variable speed motor so that data is accessed at a constant rate. Those skilled in the art will appreciate that the angular velocity of tracks distant from the axis of rotation should be less than the angular velocity of tracks close to the axis of rotation in order to provide a constant tangential velocity for each track accessed. Therefore, the drive motor(s) will preferably vary from higher to lower speed depending on the distance of the accessed track from the axis of rotation. Specifically, for an accessed shell, the angular velocity of the shell will be slowest when accessing the equatorial track and fastest when accessing the tracks closest to the poles. Similarly, for a given track latitude, inner shells will be rotated at a higher angular velocity than outer shells. A variable speed motor for adjusting the proper angular velocity for different tracks on a magnetic or optical disc is known in the art and this type of motor can be easily adapted to drive the shells disclosed herein.

As shown in FIG. 7, the drive shafts are arranged along a common axis of rotation 212, and the laser-optical device 214 is supported by a shaft 214s which extends through the inner most drive shaft which drives the gear 202d. As shown in FIG. 7a, the polar openings 202p, 204p, 206p, 208p, 210p of the shell system 200 are substantially circular and are each provided with a toothed edge 202t, 204t, 206t, 208t, 210t. As mentioned above, the size of each polar opening 202p, 204p, 206p, 208p, 210p preferably increases as the size of the shell increases such that the inner-most shell has the smallest opening and outer shells have increasingly larger openings. The size of the gears 202d, 204d, 206d, 208d, 210d of the shell driver corresponds to the size of the polar openings such that the smallest gear 202d engages the toothed edge 202t of the polar opening 202p of the inner-most shell 202, etc. The relative sizing of the gears and the polar openings allows the shell driver to engage each shell individually while the laser-optical device 214 is located at the center of the inner-most shell 202, results in a centering of the laser-optical device 214 when it is engaged in the shell, and allows the laser-optical device to access the lower polar tracks of each shell without interference from the gears.

The shell system 200 is easily mounted on the driver/optical device as shown in FIG. 7. In order to facilitate machine handling of the shell system 200, a handle or hook 200h may be mounted on the outer surface of the outer-most shell 210 at the pole opposite the polar openings. In this manner, the shell system 200 can be mounted and unmounted by lifting or lowering the shell system over the driver/optical device with the use of the handle 200h. It should be noted that the handle or hook 200h is preferably arranged so that it does not interfere with rotation of the shell on a track as described hereinbelow. Thus, the handle or hook 200h is preferably hinged to the outer shell, and may fit in a recess (not shown) in the outer shell. As an alternative to a handle or hook, a magnetically responsive surface portion may be provided at the pole opposite the openings so that the medium can be lifted and transported by a magnetic mechanism. A dome cap may be provided to cover to polar openings and thereby facilitate rolling the spheres along a track as described in detail below.

Figure 7B:
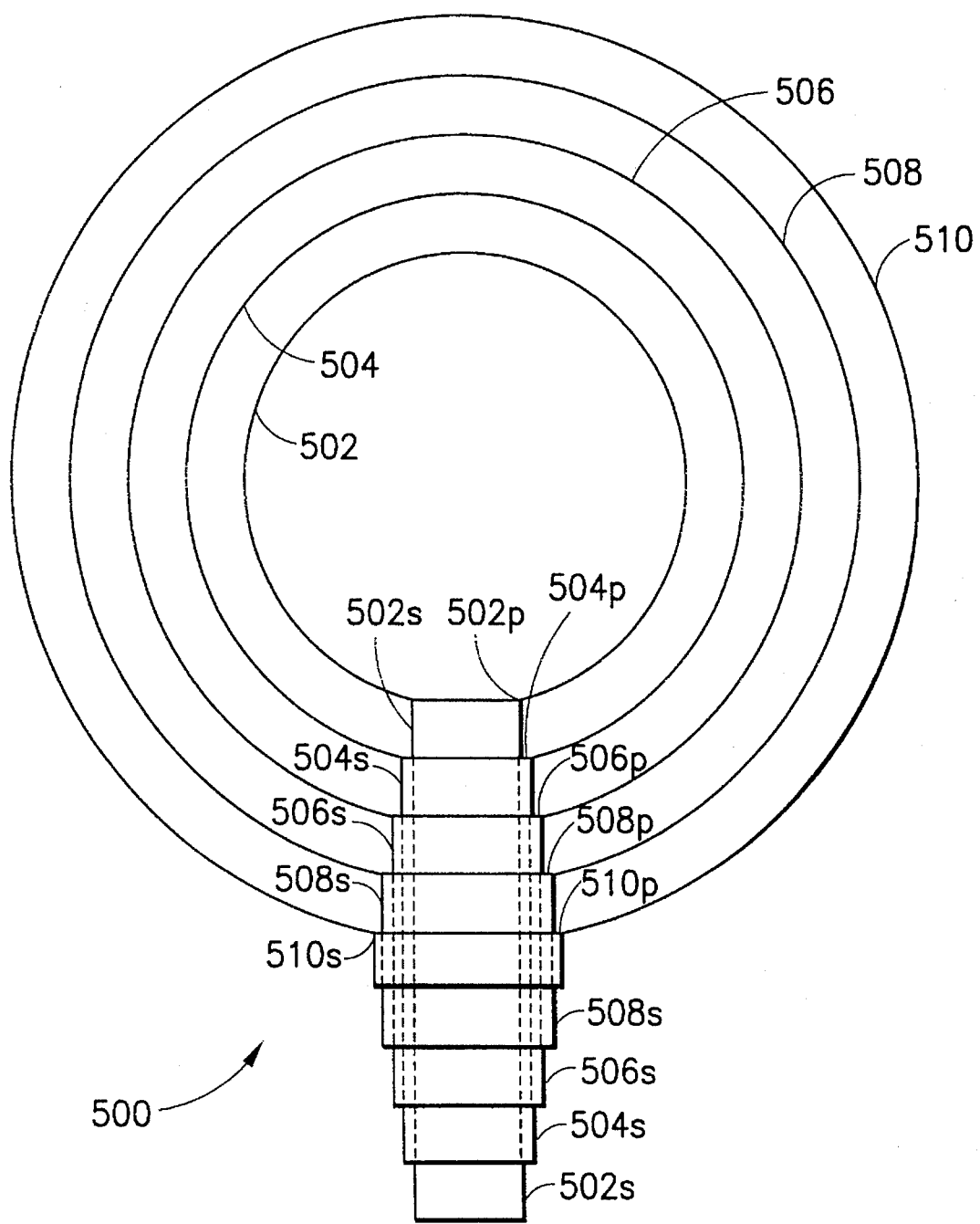
FIG. 7b is a view similar to FIG. 5 of another embodiment of spherical shells with sleeves extending from their polar openings for engaging a shell driver.

FIG. 7b shows yet another embodiment of a spherical shell storage medium 500. The medium 500 is substantially the same as the medium 200 described above except for the polar openings 502p–510p. As shown in FIG. 7b, each polar opening is provided with a respective cylindrical stem 502s–510s. Each stem has a different length, with the inner shell 502 having the longest stem 502s and the outer shell 510 having the shortest stem 510s. Also, each stem has a different diameter, with the stem 502s having the smallest diameter and the stem 510s having the largest diameter. As can be seen in FIG. 7, the free ends of the stems form stepped coaxial engagement surfaces for coupling the medium 500 to a driver mechanism (not shown). The free ends of the stems may be provided with gear teeth or may be relatively smooth. A suitable driver for the medium 500 can be one or more variable speed motors provided with one or more gears or rubber rollers which engage(s) the stems to rotate the stems and thus the spheres. It is also possible to engage the stems selectively with a locking collar ring.

With further reference to FIG. 7b, according to another embodiment of the invention, the individual spherical shells 502–510 of the medium 500 may be rotated by a magnetic field. According to this embodiment of the invention, the outer surface of each shell is coated with a thin film electromagnet having thin film leads which terminate at the free end of the respective stem. The thin film electromagnet is energized by a circuit which is coupled to the leads on the stem with a locking collar ring. An oscillating magnetic field is produced outside the medium 500 and causes the shell with the energized thin film electromagnet to rotate.

Figure 8:
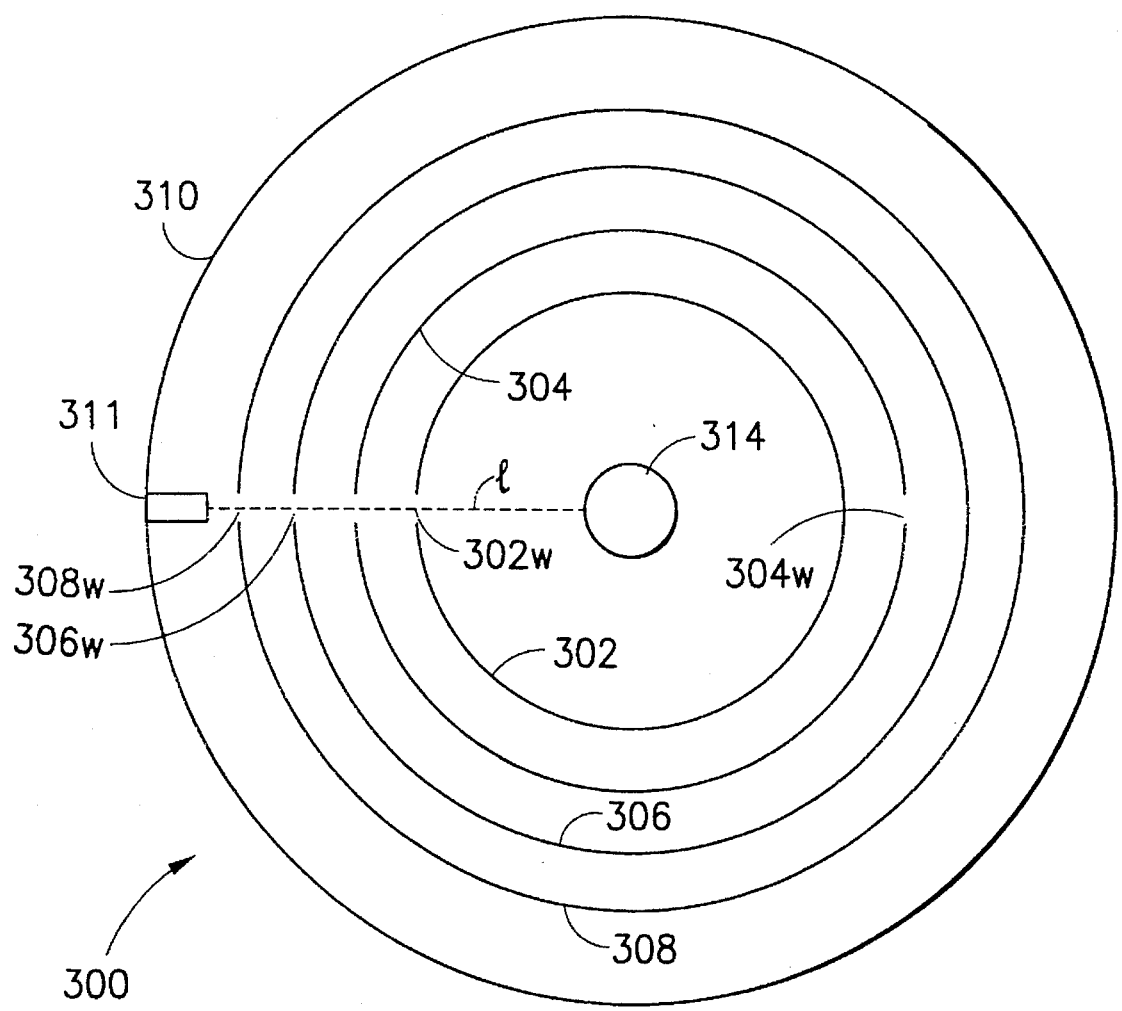
FIG. 8 is a view similar to FIG. 4 illustrating a concentric shell storage system where the laser source and detector are displaced relative to each other.
Figure 9:
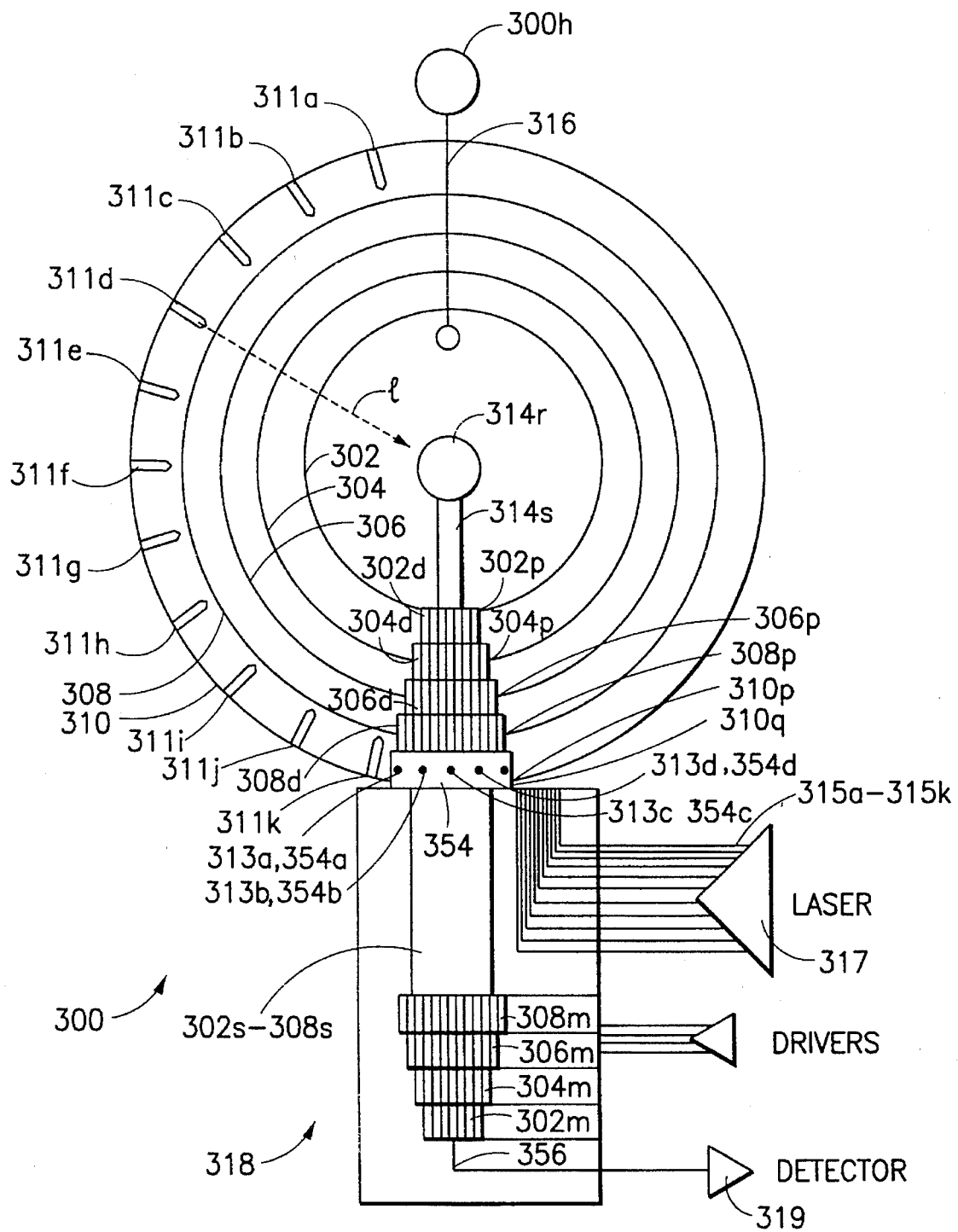
FIG. 9 is a schematic diagram illustrating a first embodiment of a laser-optical device according to FIG. 8, where laser sources are on the outside of the spherical shells.
Figure 10:
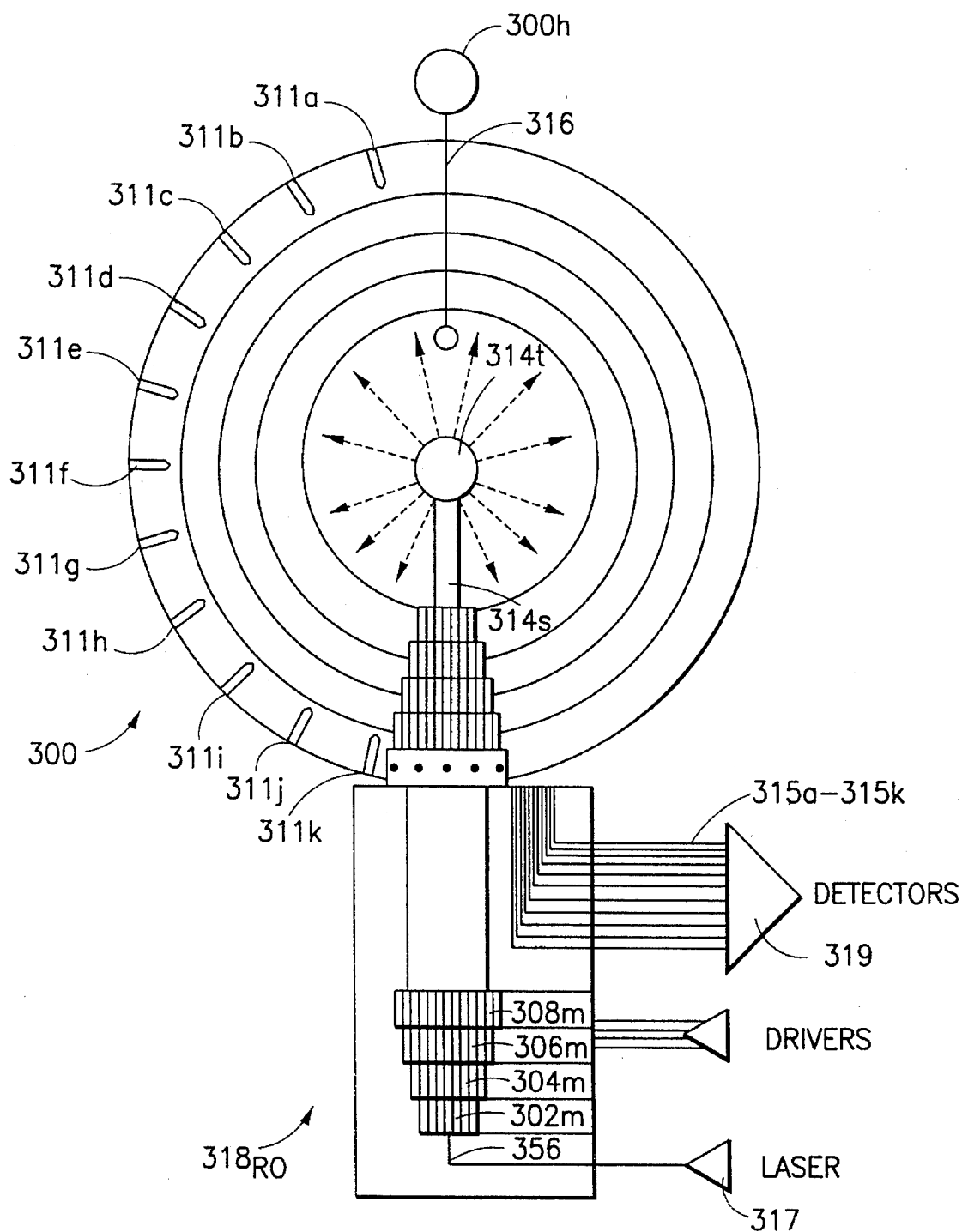
FIG. 10 is a view similar to FIG. 9 illustrating a second alternate embodiment of a laser-optical device where the detectors are on the outside of the spherical shells.

FIG. 8 shows another embodiment of a storage medium 300 according to the invention which is similar to the embodiment of FIG. 4 except that the storage medium 300 includes a portion of the laser-optical device. In this embodiment, the inner-most shells 302, 304, 306, 308 are substantially the same as the embodiment 200 described above, with each having a transparent window 302w, 304w, 306w, 308w. However, the outer-most shell 310 is provided with one or more fiber optic transmitters or receptors 311 which are directed radially inward from the inner surface of the shell 310 toward the center of the storage medium 300. Where the outer shell 310 includes fiber optic transmitters, the center of the medium is provided with a receptor 314; an embodiment of which is described in more detail below with reference to FIG. 9. Where the outer shell includes receptors, the center of the medium is provided with a fiber optic transmitter; an embodiment of which is described in more detail with reference to FIG. 10. In the embodiments of FIGS. 9 and 10, the shells are partially transparent, with data being represented by relatively opaque and transparent spots rather than by relatively reflective and non-reflective flats and pits.

Turning to FIG. 9, a storage medium 300 such as shown in FIG. 8 is provided and has a plurality of shells which are spaced apart from each other by a polar axle 316. The outer-most shell 310, is provided with a plurality of fiber-optic transmitting conduits which each have one end 311a–311j directed radially inward from the inner surface of the shell 310 and which are spaced latitudinally apart relative to each other so as to be directed at a respective data track of an interior shell such as shown in FIG. 6. The polar opening 310p of the outer most shell 310 is provided with a cylindrical fiber-optic coupling 310q in which the other ends 313a14 313j of the fiber-optics are radially arranged for optical coupling with the laser-optical device of this embodiment as described below.

The shell driver 318 according to this embodiment includes a plurality of concentric gears 302d, 304d, 306d, 308d which are coupled via concentric cylindrical drive shafts 302s–308s to respective drive motors 302m–308m. The drive motors 301m–302m are individually operable as described above so that the shells 302–308 are individually rotatable. An omnidirectional optical receptor 314r is mounted at the end of a shaft 314s which is coaxial to the drive shafts 302s–308s such that the receptor 314r is located substantially at the center of the inner shell 302 when the medium 300 is placed on the shell driver 318 as shown in FIG. 9. The optical receptor 314r is coupled by an optical fiber 356 to a photodetector 319. A cylindrical optical coupling 354 is arranged coaxial with the gears 302d–308d so as to optically couple with the cylindrical fiber-optic coupling 310q of the outer-most shell 310. A plurality of fiber-optics 315a–315k are thereby optically coupled to the ends 311a–311k of the fiber optics in the shell 310. The fiber optics 315a–315k are selectively coupled to a source of laser radiation 317.

The operation of this "shine-in" embodiment 300 of the invention is slightly different than the embodiment 200 described above. From the foregoing, it will be appreciated that the outer shell 310 is not rotated, while the inner shells 302–308 are rotated in a manner similar to the shells 202–208 described above. As mentioned above, each of the inner shells 302–308 is substantially semi-transparent and is provided with a longitudinal window 302w–308w within which no data is written. As shown in FIG. 9, laser light is transmitted from a selected one of the fiber optic ends, e.g. 311d on the inner surface of the outer shell 310 so as to choose a track of a shell for reading or writing. A shell, e.g., shell 304 is selected for reading or writing by aligning all of the windows 302w, 306w, 308w of the other shells so that an unobstructed light path l is provided between the fiber optic end 311d, the shell being accessed 304, and the optical receptor 314r. Laser light from the fiber optic end 311d is transmitted through the windows of shells 308 and 306 to the shell 304 being accessed. In the case of reading, relatively opaque and transparent spots in the track in shell 304 corresponding to the latitudinal position of fiber optic end 311d selectively block or transmit light passing through the window of shell 302 toward the receptor 314r. In the case of writing, the windows of shells 308 and 306 provide an unobstructed path for radiation from the fiber optic end 311f to impinge on the shell 304 and cause spots on the photo-chemically responsive selected track to become opaque or clear. This embodiment of the invention does not require a movable laser aiming device since the various tracks on the different shells are selected by simply Switching the source 317 of laser radiation to the appropriate fiber optic 315a–k, and thence to optic ends 311a–311k. Those skilled in that art will appreciate that this can be easily accomplished using any of several electrically operated light gates.

FIG. 10 shows another embodiment of a laser-optical device and shell driver 418 which is similar to the embodiment of FIG. 9. In FIG. 10, the optical medium 300 is identical to the medium 300 of FIG. 9 and the mechanical shell driver and laser-optical device $318_{RO}$ is substantially identical to the shell driver and laser-optical device of FIG. 9, with the following exceptions: a substantially omnidirectional light transmitter 314t is located at the end of the shaft 314s; one or more detectors 319 are coupled to the fiber optics 315a–315k; and a source of laser radiation 317 is coupled to the central fiber optic 356. Operation of this "shine-out" embodiment differs from the "shine-in" embodiment of FIG. 9 in several respects. First and foremost, it will be appreciated that light is transmitted from the center of the medium 300 radially outward to the fiber optic ends 311a–311k, rather than vice versa. Since the central transmitter 314t of laser radiation is substantially omnidirectional, writing to the medium 300 is not straight-forward. However, this embodiment achieves one advantage over the embodiment of FIG. 9 during reading operations. If a separate detector 319 is coupled to each fiber optic 315a–315k, all of the tracks on a single selected shell can be read simultaneously during a single revolution of the selected shell. The shell to be read is selected in the same manner as described in the embodiment of FIG. 9. Thus, while this embodiment sacrifices the ability to be a writer, it is a vastly more efficient reader of the medium 300.

As shown in both FIGS. 9 and 10, the medium 300 is preferably provided with a polar hook 300h so that it may be mounted and unmounted from the reader/writer 318 or the reader $318_{RO}$ by a machine as will be described below in reference to jukeboxes.

Figure 11:
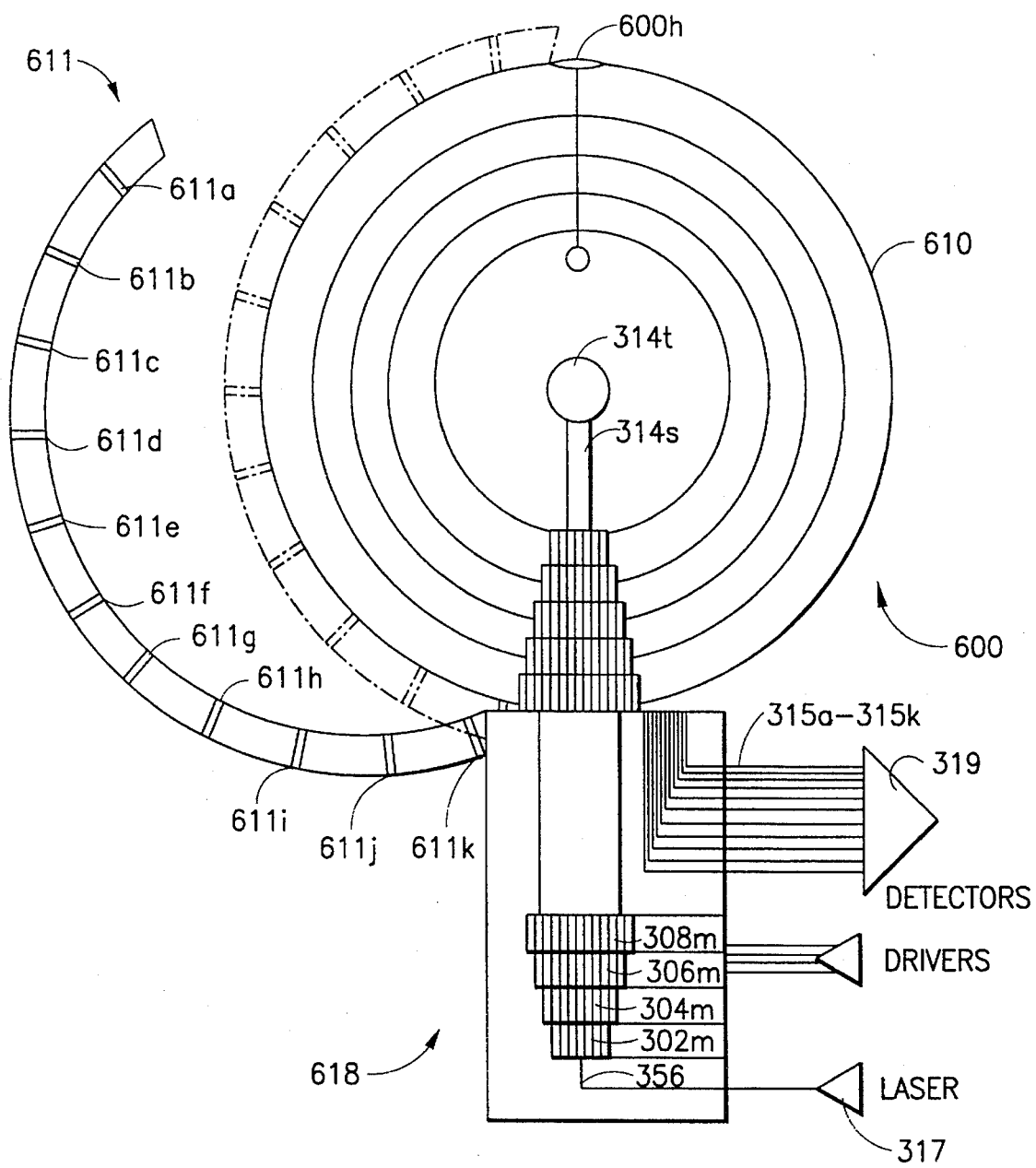
FIG. 11 is a view similar to FIG. 10 illustrating a third alternate embodiment of a laser-optical device.

FIG. 11 shows another embodiment of a laser-optical device which is similar to the embodiments of FIGS. 8–10. In this embodiment, however, the medium 600 is not provided with integral fiber optics, but is provided with a rotating outer shell 610 which is transparent at least along a meridional strip. The driver/laser-optical device 618 is provided with a semi-circular arm 611 which carries a bundle of fiber optics 611a–611k and which is hingedly mounted on the driver 618. FIG. 11 shows this arm in two positions: the open position (drawn in solid line) and the closed operating position (drawn in phantom line). The arm 611 is moved to the open position when a medium 600 is to be mounted or unmounted on the driver and is moved to the closed position when data on the medium is to be accessed. The medium in this embodiment is substantially the same as described above with reference to FIGS. 4, 5, and 7 except that the outer shell 610 is at least partially transparent so that the fiber optics 611a–611k in the arm 611 of the laser-optical device 618 may either transmit or receive light through the outer shell 610. The polar cap of the medium shown in FIG. 11 is provided with a magnetically responsive coating 600h so that the medium may be lifted by a robotic arm (not shown). It will be appreciated that this embodiment of the laser-optical device may be utilized with either a shine-in or shine-out system, i.e. with the source of laser light being provided either from the center of the spheres or from the fiber-optics in the arm.

Figure 12:
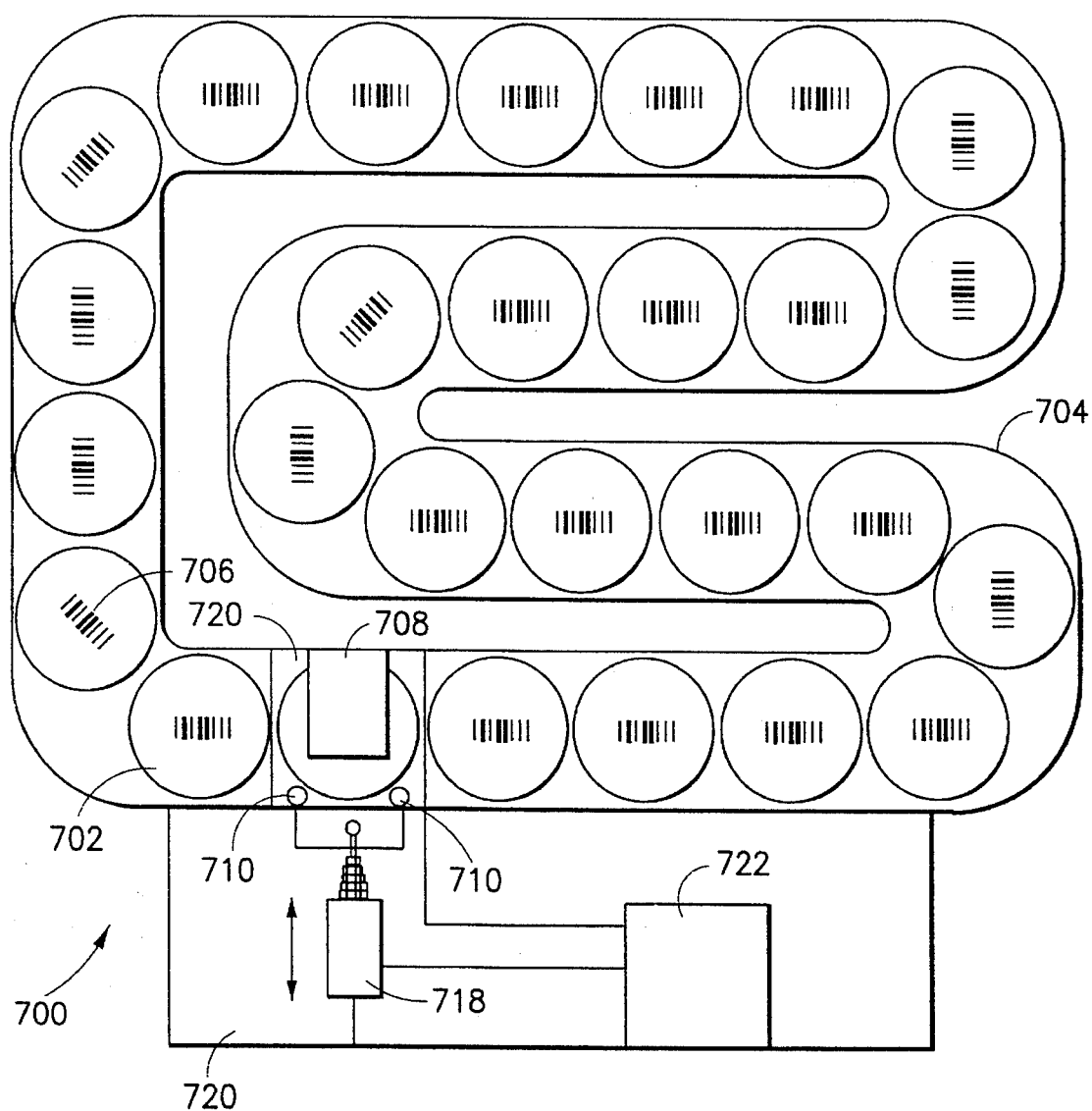
FIG. 12 is a schematic diagram of a jukebox system for spherical shell storage devices.

FIG. 12 shows one embodiment of a jukebox access apparatus 700 wherein a single reader/writer 718 can automatically access dozens of spherical shell media 702. According to this embodiment, a relatively large number of spherical media are loaded onto a track system 704 having a conveyor for moving the media 702 relative to a reader/writer 718. The reader/writer is movable relative to the track system so that upon moving a selected medium into position relative to the reader/writer, the reader/writer is moved into the spherical medium for rotating it and accessing data as described above. Each spherical medium is preferably identified by one or more bar code labels 706 on its outer surface which is read by a bar code reader 708 in the vicinity of the reader/writer 718 to determine the identity of a selected medium. An alignment device 710 is also arranged in the vicinity of the reader/writer 718 so that the polar opening in the medium can be aligned with the axis of the reader/writer. As mentioned above, the media 702 may be provided with polar caps to protect their interiors from dust and other foreign material. If no polar cap is provided, the entire jukebox system is hermetically sealed. If, on the other hand, the media 702 are provided with polar caps, it is not necessary to seal the entire jukebox system. Using media with polar caps, the jukebox need only be provided with a sealable chamber 720 adjacent the reader/writer 718. A controller 722 is coupled to the reader/writer 718, the alignment device 710, and the sealable chamber 720. When media 702 are moved through the conveyor 704, their respective polar caps remain attached and the chamber 720 is open to allow media to pass through it. After a medium is selected by the bar code reader 708, the controller 720 closes the chamber 720, evacuates it, causes the polar cap to be removed, and moves the reader/writer into the medium. When a different medium is to be accessed, the reader/writer is moved out of the medium, the polar cap is replaced, air is allowed to enter the chamber 720, and the chamber is opened.

Figure 13:
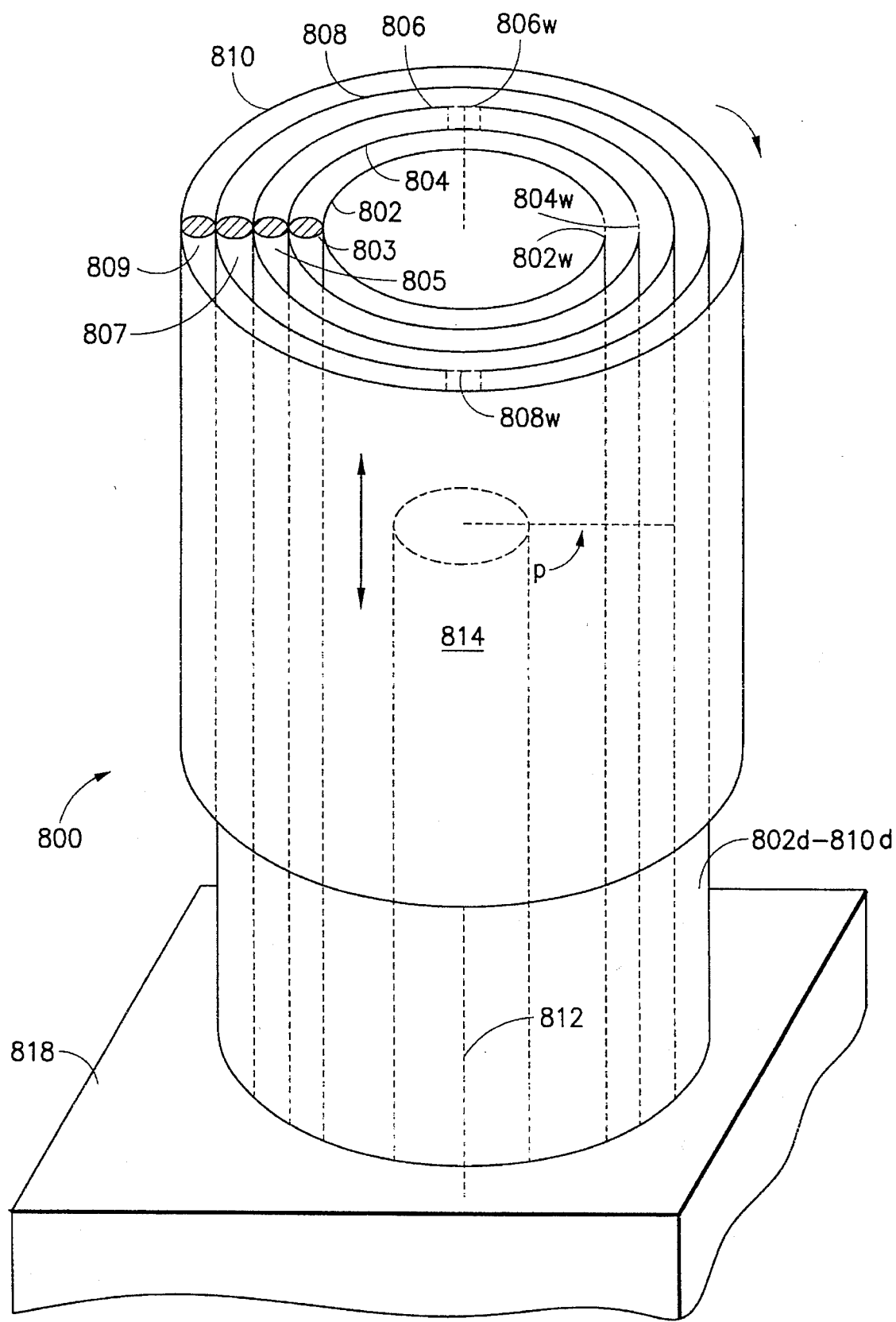
FIG. 13 is a schematic diagram of a cylindrical shell storage device.

FIG. 13 shows a first embodiment of a cylindrical shell medium 800 and an apparatus 818 for accessing data on the medium. In this embodiment, five cylindrical shells 802, 804, 806, 808, 810 having a common axis of rotation 812 are shown. Each shell has a number of parallel data tracks which follow paths which lie in planes substantially perpendicular to the axis of the rotation. An optically transparent window 802w, 804w, 806w, 808w is also provided on each shell (except for the outermost shell 810) and transects all of the data tracks on the shell. The shells are spaced apart from each other by rod bearings 803, 805, 807, 809. The access apparatus 818 includes five cylindrical concentric drivers 802d–810d which engage respective cylindrical shells so that the may be individually rotated. A laser optical device 814 is movable along the axis of rotation of the shells to select track on an accessed shell which is read or written to along an optical path p which is radial to the cylindrical shells. An individual shell is selected for access by aligning the optical windows of the shells which are located inner relative to the accessed shell. For example, FIG. 13 shows the third shell 806 being accessed by aligning the optical windows of the inner two shells 802 and 804.

Figure 14:
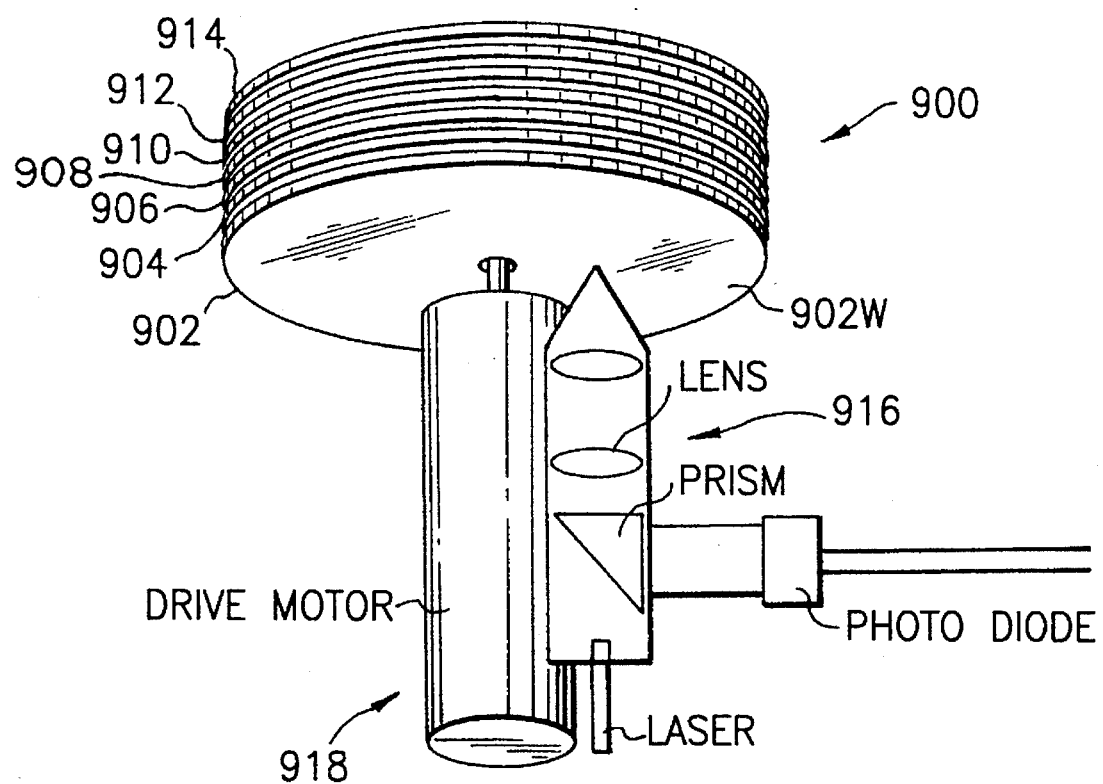
FIG. 14 is a schematic diagram of a multiple disc storage system with discs having an optical window and being independently rotatable.

FIG. 14 shows yet another embodiment 900 of the invention which combines the window principle of the invention with relatively conventional compact disc technology. In this embodiment, a plurality of optical discs 902–914 are provided, each having a radially extending laser-transparent window, e.g. 902w. The discs are stacked on top of each other and mounted on a modified driver 918 which allows the discs to be individually rotated. A laser-optical device 916 is conventionally mounted beneath the lowest disc and is movable radially in a relatively conventional manner. The laser-optical device 916 is modified to have a longer focusing range so that it can be focused onto any of the discs in the stack. In order to access discs stacked on top of the lower disc, all of the discs beneath the accessed disc are rotated so that their optical windows align above the radial path of the laser-optical device 916 and the focus of the laser-optical device is adjusted to the accessed disc. The lower discs are held stationary and the accessed disc is rotated. Depending on the depth of field of the laser-optical device, the upper discs may also be aligned so that their optical windows align with the lower discs. While not necessary, it is desirable that means be provided for automatically returning the discs into the position in which their optical windows are aligned when they are not being rotated.

The present invention provides a relatively high volumetric storage density as compared to media which store data in only two dimensions. The actual storage capacity of a spherical shell system can be approximated by calculating the total surface area upon which data may be stored and then applying a relatively standard approximation of areal storage density to the total surface area. The volumetric storage density can then be approximated by comparing the total storage capacity to the overall volume of the medium.

In particular, total surface area K upon which data can be stored in a spherical shell system as described herein may be represented by the equation below in which r is the radius of each sphere, s is the size of the longitudinal window in radians, and d is the diameter of the polar opening:

$$K \sum_{spheres} = (2\pi - s)r^2 \left[ 1 + \cos\left( \arcsin\left[ \frac{d}{2r} \right] \right) \right] \quad (1)$$

It will be appreciated that equation (I) is a summation of separate calculations for each spherical shell. It will also be appreciated that the total usable surface area of the spherical shell storage medium will depend greatly on how close the shells may be spaced. It is believed that by using state-of-the-art materials and hermetically sealed shells, it will be possible to provide several hundred shells within an outer shell having a radius of several inches. However, for the purpose of illustrating a readily enabled embodiment of the invention, a prototype medium may be constructed of five shells having respective radii of 1.5, 1.75, 2, 2.25, and 2.5 inches. Each shell in the prototype is provided with a window of 0.35 radians and a polar opening diameter of 1, 1.5, 2, 2.5, and 3 inches respectively. Such a prototype medium would have a total volume of approximately 65 in$^3$, i.e the volume of the outer five inch diameter sphere, compared to a conservative volume of 14 in$^3$ for a five inch CDROM. Applying equation (1), the total usable surface area of the spherical medium would be approximately 226 square inches. Assuming that data can be stored on the surfaces of the shells at approximately the same areal density as data is stored on a CDROM, the prototype medium will store approximately 10,000 megabytes. The resulting volumetric storage density for the prototype spherical medium is therefore approximately 154 megabytes per cubic inch as compared to a volumetric storage density of approximately 61.9 megabytes per cubic inch for a CDROM in a protective caddy. The prototype medium, therefore, provides an increase in storage density of over 200%.

As mentioned above, it is not necessary to protect the exterior of the spherical storage medium according to the invention since all the data is written on the inside surfaces. Nevertheless, since a spherical medium may only be conveniently stored in a cubical space, the volume "occupied" by the prototype medium may be as much as 125 cubic inches. Even given that volume, the prototype medium has a volumetric storage density of approximately 80 megabytes per cubic inch.

Those skilled in the art will appreciate that the prototype medium described above is a conservative estimate using relatively large spaces between shells which can be constructed from readily available materials. By using more exotic materials and hermetically sealed processes, the storage capacity of the medium can be increased many times over the prototype medium.

The total surface area K upon which data can be stored in a cylindrical shell system as described herein may be represented by the equation below in which r is the radius of each cylinder, s is the size of the optical window in radians, and h is the height (or length) of each cylinder:

$$K \sum_{cylinders} = hr(2\pi - s) \quad (2)$$

It will be appreciated that equation (2) is a summation of separate calculations for each cylindrical shell. It will also be appreciated that the total usable surface area of the cylindrical shell storage medium will depend greatly on how close the shells may be spaced. In a prototype cylindrical shell system, five shells, each five inches long (or high) are provided. Each shell has a respective radius of 1.5, 1.75, 2, 2.25, and 2.5 inches and an optical window of 0.35 radians. Applying equation (2), the prototype cylindrical shell system will have a total storage surface area of approximately 296.6 square inches and will therefore store approximately 13,170 megabytes. The volume of the cylindrical shell system is approximately 98 cubic inches, about one and a half times that of the spherical prototype. The cylindrical system achieves a volumetric storage density of about 134 megabytes per cubic inch, slightly less than the spherical system. However, when considering that both the spherical and cylindrical systems are likely to occupy the same cube shaped space of 125 cubic inches, the cylindrical system provides a practical storage density of 105 megabytes per cubic inch. Thus, in the exemplary application of the prototype systems, the cylindrical system is more efficient than the spherical system. The actual efficiency of the two systems will depend on how many shells can be assembled and how closely together they can be spaced.

The total surface area K upon which data can be stored in a system of stacked optical discs with optically transparent windows as described herein may be represented by the equation below in which $r_{outer}$ is the radius of each disc, $r_{inner}$ is the radius of the unused hub area of each disc, s is the size of the optically transparent window in radians, and n is the number of discs:

$$K_{Discs} = n \left[ (\pi(r_{outer}^2 - r_{inner}^2)) - \frac{s(r_{outer}^2 - r_{inner}^2)}{2} \right] \quad (3)$$

It will be appreciated that since all of the discs in the stacked discs embodiment have the same radius, equation 3 is the product of the usable area of one disc times the number of discs in the stack. In a prototype stacked disc system, optical discs of conventional size (4.73 inches diameter and 0.05 inches thick) are stacked with space between them equal to the thickness of one disc. A stack of discs five inches high would therefore contain fifty discs. Each disc is provided with an optical window which is 0.35 radians. Applying equation (3), the prototype stacked discs system will have a total storage surface area of approximately 723 square inches and will therefore store approximately 32,100 megabytes. The volume of the stacked discs system is approximately 98.2 cubic inches and achieves a volumetric storage density of 327 megabytes per cubic inch. While it appears that the stacked discs system provides the greatest volumetric storage density, it should be noted that the prototype stacked discs system generously utilizes fifty discs compared to the conservative five shells which are used in the cylindrical and spherical prototypes. If the cylindrical and spherical prototypes are made with fifty shells, they would achieve a storage density of four to five times that of the stacked discs embodiment.

There have been described and illustrated herein Several embodiments of a three dimensional data storage medium and apparatus for accessing the medium. While particular embodiments of the invention have been described, it is not intended that the invention be limited thereto, as it is intended that the invention be as broad in scope as the art will allow and that the specification be read likewise. Thus, while particular dimensions have been given in examples, it will be understood that the dimensions of the media may vary according to available materials and manufacturing techniques. Moreover, while several different apparatus have been disclosed for rotating the media, it will be appreciated that with the benefit of the instant disclosure, other apparatus for rotating the media could be used with similar results obtained. In addition, while several different embodiments of laser-optical devices have been disclosed, it will be understood that other laser-optical devices can achieve the same or similar function as disclosed herein. In fact, it should be appreciated that different aspects of different embodiments of the invention can be mixed and matched if desired. Furthermore, while the shell systems of the invention have been disclosed as either spherical or cylindrical, it will be understood that ellipsoidal shell systems may also be possible, given the teachings of the present disclosure. Also, while the provision of the optically transparent window is an important concept of the invention, the utilization of curvilinear data storage surfaces is also an important concept of the invention. Therefore, it will be understood that the curvilinear multiple layer storage medium of the invention might be usable without an optical window by applying the techniques known in the art for accessing multiple planar storage surfaces. It will therefore be appreciated by those skilled in the art that yet other modifications could be made to the provided invention without deviating from its spirit and scope as so claimed.

We claim:

1. A three dimensional data storage medium comprising:
    a plurality of concentric shells, each shell having
        a common axis of rotation and a plurality of substantially circular data tracks, each data track following a path which lies in a plane substantially perpendicular to said axis of rotation,
        an optically transparent window which transects a plurality of said data tracks,
        drive responsive means for rotating the shell about said axis of rotation in response to a driver; wherein
    at least one of said plurality of shells is rotatable about said axis of rotation and relative to another of said plurality of shells.

2. A data storage medium according to claim 1, further comprising:
    shell spacing means for spacing each of said concentric shells relative to each other.

3. A data storage medium according to claim 2, wherein:
    each of said shells is individually rotatable.

4. A data storage medium according to claim 1, further comprising:
    an outer-most shell concentric with said plurality of concentric shells.

5. A data storage medium according to claim 4, wherein:
    said outer-most shell has an inside surface having a plurality of substantially circular data tracks, each data track following a path which lies in a plane substantially perpendicular to said axis of rotation, and a drive responsive means for rotating the outer-most shell about said axis of rotation in response to the driver.

6. A data storage medium according to claim 4, wherein:
    said outer-most shell has a hard protective outer surface.

7. A data storage medium according to claim 1, wherein:
    said drive responsive means comprises drive engagement means for engaging the driver.

8. A data storage medium according to claim 1, wherein:
    each of said shells is substantially spherical, said axis of rotation is a polar axis, each of said tracks is latitudinally arranged relative to said polar axis, and each of said optically transparent windows is longitudinally arranged relative to said polar axis.

9. A data storage medium according to claim 8, wherein:
    each of said shells has a polar cap opening through which a laser-optical device is insertable for accessing each of said data tracks.

10. A data storage medium according to claim 9, wherein:
    said drive responsive means is a drive engagement means, and
    each of said polar cap openings includes said drive engagement means for engaging the driver and for selectively rotating said shells.

11. A data storage medium according to claim 9, wherein:
    each of said shells is substantially opaque except for said optically transparent window.

12. A data storage medium according to claim 10, wherein:
    said drive engagement means comprises gear teeth on an inner edge of each of said polar cap openings.

13. A data storage medium according to claim 10, wherein:
    each of said polar cap openings has a different diameter.

14. A data storage medium according to claim 13, wherein:
    said drive engagement means comprises gear teeth on an inner edge of each of said polar cap openings.

15. A data storage medium according to claim 13, wherein:
    said drive engagement means comprises a cylinder extending from each of said polar cap openings.

16. A data storage medium according to claim 9, further comprising:

shell spacing means for spacing each of said concentric shells relative to each other, wherein said shell spacing means comprises a polar axle opposite to said polar cap openings.

17. A data storage medium according to claim 1, further comprising:

an outer concentric shell having a plurality of optical means for one of transmitting and receiving light, each of said optical means being located on an inner surface of said outer shell and being aimed radially inward from said outer shell at a corresponding data track.

18. A data storage medium according to claim 17, wherein:

each of said optical means is coupled to one end of a respective optical conduit for one of transmitting light to and receiving light from said optical means.

19. A data storage medium according to claim 18, wherein:

a respective other end of each of said optical conduits is provided with optical coupling means for optically coupling with one of a light source and a light detector.

20. A data storage medium according to claim 19, wherein:

each of said shells has a concentric polar cap opening, and said optical coupling means comprises a cylindrical extension from said polar cap opening of said outer concentric shell.

21. A data storage medium according to claim 1, wherein:

each of said shells is substantially cylindrical, said axis of rotation is a cylinder axis, each of said tracks is substantially circular, and each of said optically transparent windows is longitudinally arranged relative to said cylinder axis.

22. A data storage medium according to claim 2, wherein:

said shell spacing means comprises a plurality of rod bearings interspaced between said shells.

23. A data storage medium according to claim 22, wherein:

said drive responsive means comprises drive engagement means for engaging the driver, and said drive engagement means comprises a toothed edge of said shell.

24. An apparatus for providing data access to a three dimensional optical data storage medium having a plurality of concentric shells upon which data is stored, each of said shells having a plurality of data tracks and an optically transparent window transecting a plurality of the data tracks, said apparatus comprising:

a drive means for selectively rotating a first of the concentric shells relative to a second of the concentric shells, wherein said drive means aligns a plurality of the optically transparent windows of the shells to thereby select one of the shells for data access;

a laser-optical means for one of reading and writing to the data tracks on the shells; and means coupled to said laser-optical means for directing said laser optical means to a specific track on a selected shell.

25. An apparatus according to claim 24, wherein:

said drive means comprises a plurality of concentric gears of different diameter.

26. An apparatus according to claim 24, wherein:

said laser-optical means comprises an aimable optical head mounted at the end of a support which is concentric to said drive means.

27. An apparatus according to claim 24, wherein:

said laser-optical means comprises an omnidirectional light detector mounted at the end of a support which is concentric to said drive means and a plurality of optical conduits selectively coupled to a source of laser radiation.

28. An apparatus according to claim 24, wherein:

said laser-optical means comprises an omnidirectional light emitter mounted at the end of a support which is concentric to said drive means and optically coupled to a source of laser radiation, and a plurality of optical conduits selectively coupled to a light detector.

29. An apparatus according to claim 24, wherein:

said laser-optical means comprises an omnidirectional light emitter mounted at the end of a support which is concentric to said drive means and optically coupled to a source of laser radiation, and a plurality of optical conduits coupled to respective light detectors.

30. A data storage system comprising:

a) a data storage medium having a plurality of concentric shells, each shell having a common axis of rotation and a plurality of substantially circular data tracks, each data track following a path which lies in a plane substantially perpendicular to said axis of rotation, an optically transparent window which transects a plurality of said data tracks, drive responsive means for rotating the shell about said axis of rotation is response to a driver, wherein at least one of said plurality of shells is rotatable about said axis of rotation and relative to another of said plurality of shells; and b) an apparatus for providing data access to said medium, said apparatus having said driver for selectively rotating a first of said concentric shells relative to a second of said concentric shell, wherein said driver aligns a plurality of said optically transparent windows of said shells to thereby select one of said shells for data access, a laser-optical means for one of reading and writing to the data tracks on said shells, and means coupled to said laser-optical means for directing said laser optical means to a specific track on a selected shell.

31. A three dimensional data storage medium, comprising:

a plurality of concentric shells, each shell having a common axis of rotation and a curvilinear data storage surface upon which data is stored in a plurality of substantially circular data tracks, each data track following a path which lies in a plane substantially perpendicular to said axis of rotation, wherein at least one of said shells has a drive responsive means for rotating the shell about said axis of rotation in response to a drive means.

32. A three dimensional data storage medium according to claim 31, wherein:

said drive responsive means comprises a drive engagement means, and each of said shells has a said drive engagement means for engaging the drive means which rotates the shell independently about said axis of rotation.

33. A three dimensional data storage medium according to claim 31, wherein:

each of said concentric shells is substantially spherical.

34. A three dimensional data storage medium according to claim 31, wherein:

each of said concentric shells is substantially cylindrical.

35. An optical data storage medium comprising:

at least two optical data storage surfaces upon which data is stored in concentric circular tracks, at least one of said data storage surfaces having a laser transparent window which transects at least some of said circular tracks, wherein said at least two data storage surfaces are independently rotatable about a common axis.

36. An optical data storage medium according to claim 35, wherein:

said at least two data storage surfaces are substantially planar.

* * * * *